US008829725B2

(12) United States Patent
Urano

(10) Patent No.: US 8,829,725 B2
(45) Date of Patent: *Sep. 9, 2014

(54) WIRELESS POWER FEEDER, WIRELESS POWER RECEIVER, AND WIRELESS POWER TRANSMISSION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 798 days.

This patent is subject to a terminal disclaimer.

(21) Appl. No.: 13/051,184

(22) Filed: Mar. 18, 2011

(65) Prior Publication Data

US 2011/0227420 A1  Sep. 22, 2011

(30) Foreign Application Priority Data

Mar. 19, 2010 (JP) .................................. 2010-064379
Mar. 26, 2010 (JP) .................................. 2010-071901
Feb. 3, 2011 (JP) .................................. 2011-021952
Feb. 3, 2011 (JP) .................................. 2011-021953

(51) Int. Cl.
   *H01F 27/42* (2006.01)
   *H01F 37/00* (2006.01)
   *H01F 38/00* (2006.01)
   *H02J 17/00* (2006.01)
   *H04B 5/00* (2006.01)
   *H02J 5/00* (2006.01)

(52) U.S. Cl.
   CPC .............. *H02J 17/00* (2013.01); *H04B 5/0081* (2013.01); *H04B 5/0037* (2013.01); *H02J 5/005* (2013.01)
   USPC ........................................................ 307/104

(58) Field of Classification Search
   USPC ...................................................... 307/104
   See application file for complete search history.

(56) References Cited

U.S. PATENT DOCUMENTS 6,208,135 B1 * 3/2001 Shattil ........................... 324/225
7,741,734 B2   6/2010 Joannopoulos et al.

(Continued)

FOREIGN PATENT DOCUMENTS

CN  102082469 A  6/2011
JP  10-225129 A  8/1998

(Continued)

OTHER PUBLICATIONS

Tso-Sheng Chan, et al., "LLC Resonant Converter for Wireless Energy Transmission System with PLL Control," Sustainable Energy Technologies, 2008. IEEE international Conference on, IEEE, Piscataway, NJ, Nov. 24, 2008, pp. 136-139.

(Continued)

*Primary Examiner* — Rexford Barnie
*Assistant Examiner* — Rasem Mourad
(74) *Attorney, Agent, or Firm* — McDermott Will & Emery LLP

(57) ABSTRACT

Power is fed from a power feeding coil L2 to a power receiving coil L3 by magnetic resonance. A VCO 202 alternately turns ON/OFF switching transistors Q1 and Q2 at a drive frequency fo, whereby AC power is supplied to the power feeding coil L2, and then the AC power is supplied from the power feeding coil L2 to the power receiving coil L3. A phase detection circuit 114 detects a phase difference between current and voltage phases, and the VCO 202 adjusts the drive frequency fo such that the phase difference becomes zero. When load voltage is changed, the detected voltage phase value is adjusted with the result that the drive frequency fo is adjusted.

28 Claims, 30 Drawing Sheets

(56) References Cited

U.S. PATENT DOCUMENTS

| | | | |
|---|---|---|---|
| 8,531,059 B2 * | 9/2013 | Ichikawa et al. | 307/104 |
| 2007/0222542 A1 | 9/2007 | Joannopoulos et al. | |
| 2008/0211320 A1 | 9/2008 | Cook et al. | |
| 2008/0278264 A1 | 11/2008 | Karalis et al. | |
| 2009/0015075 A1 | 1/2009 | Cook et al. | |
| 2009/0045772 A1 | 2/2009 | Cook et al. | |
| 2009/0051224 A1 | 2/2009 | Cook et al. | |
| 2009/0058189 A1 | 3/2009 | Cook et al. | |
| 2009/0072627 A1 | 3/2009 | Cook et al. | |
| 2009/0072628 A1 | 3/2009 | Cook et al. | |
| 2009/0072629 A1 | 3/2009 | Cook et al. | |
| 2009/0079268 A1 | 3/2009 | Cook et al. | |
| 2009/0102292 A1 | 4/2009 | Cook et al. | |
| 2009/0134712 A1 | 5/2009 | Cook et al. | |
| 2009/0167449 A1 | 7/2009 | Cook et al. | |
| 2009/0174263 A1 * | 7/2009 | Baarman et al. | 307/104 |
| 2009/0179502 A1 | 7/2009 | Cook et al. | |
| 2009/0195332 A1 | 8/2009 | Joannopoulos et al. | |
| 2009/0195333 A1 | 8/2009 | Joannopoulos et al. | |
| 2009/0212636 A1 | 8/2009 | Cook et al. | |
| 2009/0213028 A1 | 8/2009 | Cook et al. | |
| 2009/0224608 A1 | 9/2009 | Cook et al. | |
| 2009/0224609 A1 | 9/2009 | Cook et al. | |
| 2009/0224856 A1 | 9/2009 | Karalis et al. | |
| 2009/0243397 A1 | 10/2009 | Cook et al. | |
| 2009/0267709 A1 | 10/2009 | Joannopoulos et al. | |
| 2009/0267710 A1 | 10/2009 | Joannopoulos et al. | |
| 2009/0273242 A1 | 11/2009 | Cook | |
| 2009/0281678 A1 | 11/2009 | Wakamatsu | |
| 2009/0284083 A1 | 11/2009 | Karalis et al. | |
| 2010/0038970 A1 | 2/2010 | Cook et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0141042 A1 | 6/2010 | Kesler et al. | |
| 2010/0146308 A1 * | 6/2010 | Gioscia et al. | 713/300 |
| 2010/0148589 A1 | 6/2010 | Hamam et al. | |
| 2010/0225271 A1 | 9/2010 | Oyobe et al. | |
| 2011/0127846 A1 * | 6/2011 | Urano | 307/104 |
| 2011/0187321 A1 | 8/2011 | Hirayama | |

FOREIGN PATENT DOCUMENTS

| | | |
|---|---|---|
| JP | 2002-354712 | 12/2002 |
| JP | 2006-074848 | 3/2006 |
| JP | 2006-230032 | 8/2006 |
| JP | 4140208 | 8/2008 |
| JP | 2008-288889 | 11/2008 |
| JP | 2009-071909 | 4/2009 |
| JP | 2009-106136 | 5/2009 |
| JP | 2009-261104 | 11/2009 |
| JP | 2009-261105 | 11/2009 |
| JP | 2010-063245 | 3/2010 |
| JP | 4453741 | 4/2010 |
| JP | 2010-104159 | 5/2010 |
| JP | 2010-130878 | 6/2010 |
| JP | 2010-166693 | 7/2010 |
| JP | 2010-173503 | 8/2010 |
| JP | 2010-219838 | 9/2010 |
| JP | 2010-233442 | 10/2010 |
| JP | 2010-239690 | 10/2010 |
| JP | 2010-239769 | 10/2010 |
| JP | 2010-239777 | 10/2010 |
| JP | 2010-239816 | 10/2010 |
| JP | 2010-239838 | 10/2010 |
| JP | 2010-239847 | 10/2010 |
| JP | 2010-239848 | 10/2010 |
| JP | 4557045 | 10/2010 |
| JP | 2010-252446 | 11/2010 |
| JP | 2010-267917 | 11/2010 |
| JP | 2010-268664 | 11/2010 |
| JP | 2010-268665 | 11/2010 |
| JP | 2010-272412 | 12/2010 |
| JP | 2010-288441 | 12/2010 |
| JP | 2011-003947 | 1/2011 |
| WO | WO 2006/022365 A1 | 3/2006 |
| WO | 2009/009559 A1 | 1/2009 |
| WO | 2010030005 A1 | 3/2010 |

OTHER PUBLICATIONS

Wenzhen Fu, et al., "Study on Frequency-Tracking Wireless Power Transfer System by resonant Coupling," IEEE 6th International Power electronics and Motion Control Conference, 2009, IPEMC '09, Wuhan, China, May 17-20, 2009, pp. 2658-2663.

Young-Hae, Kim, et al. "Optimization of Wireless Power Transmission through Resonant Coupling," Compatibility and Power Electronics, CPE '09, IEEE, Piscataway, NJ, May 20, 2009, pp. 426-431.

Hao L. Li et al., "A New Primary Power Regulation Method for Contactless Power Transfer," Industrial Technology, 2009, ICIT 2009, IEEE International Conference on, IEEE, Piscataway, NJ, Feb. 10, 2009, pp. 1-5.

European Search Report issued in European Application No. 11 15 8840.6, date of completion Feb. 18, 2014.

* cited by examiner

WIRELESS POWER FEEDER, WIRELESS POWER RECEIVER, AND WIRELESS POWER TRANSMISSION SYSTEM

BACKGROUND OF THE INVENTION

1. Field of the Invention

The present invention relates to wireless power feeding and, more particularly, to power control in the wireless power feeding.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters. The type (B) utilizing radio wave is available in a long range; however, it cannot feed big electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, large current flows in the receiving coil. At this time, current also flows in the loading coil according to the principle of electromagnetic induction, and power is taken out from a load connected in series to the loading coil. By utilizing the magnetic field resonance phenomenon, high power transmission efficiency can be achieved even if the feeding coil and receiving coil are largely spaced from each other.

CITATION LIST

Patent Document

[Patent Document 1] U.S. Pat. Appln. Publication No. 2008-0278264

[Patent Document 2] Jpn. Pat. Appln. Laid-Open Publication No. 2006-230032

[Patent Document 3] International Publication No. WO2006-022365

[Patent Document 4] U.S. Pat. Appln. Publication No. 2009-0072629

[Patent Document 5] U.S. Pat. Appln. Publication No. 2009-0015075

[Patent Document 6] Jpn. Pat. Appln. Laid-Open Publication No. 2006-74848

[Patent Document 7] Jpn. Pat. Appln. Laid-Open Publication No. 2008-288889

The present inventor considers that it is necessary to provide a mechanism for automatically controlling feeding power so as to stabilize an output in order to increase availability of wireless power feeding. In a non-contact power transmission apparatus disclosed in Patent Document 6, which is included in the type (A), a secondary side unit on the receiving side notifies a primary side unit on the transmission side of the magnitude of output voltage, and the primary side unit controls feeding power in accordance with the output voltage. More specifically, an electromagnetic wave signal indicating the magnitude of the output voltage is transmitted from a coil L4 (secondary side unit) to a coil L3 (primary side unit).

In the case of the magnetic resonance type, a strong electromagnetic field generated between the feeding coil and receiving coil exerts significant influence on a signal. Thus, the mechanism disclosed in Patent Document 6 cannot directly be applied to the magnetic field resonance type. In Patent Document 7, a figure-eight-shape coil or a double hoop coil is proposed in order to reduce influence of the power magnetic field on a signal magnetic field. However, manufacturing of the coil becomes difficult due to its complicated shape. Further, it is necessary to combine a plurality of coils in order to improve communication sensitivity, which makes the manufacturing process more difficult (refer to e.g., paragraph [0028] of Patent Document 6).

A main object of the present invention is to effectively control feeding power in wireless power feeding of a magnetic field resonance type.

SUMMARY

A wireless power feeder according to the present invention feeds power from a power feeding coil to a power receiving coil by wireless using a magnetic field resonance phenomenon between the power feeding coil and power receiving coil. The wireless power feeder includes: a power feeding coil; a power transmission control circuit that feeds AC power to the power feeding coil at a drive frequency; a phase detection circuit that detects a phase difference between voltage and current phases of the AC power; a signal receiving coil that receives, from the AC power receiving side, an output signal indicating an output level by a duty ratio; and a signal adjustment circuit that DC-converts the output signal in accordance with the duty ratio. The power transmission control circuit adjusts the drive frequency so as to reduce the phase difference. The phase detection circuit performs ex-post adjustment of the detected value of both or one of the voltage and current phases in accordance with the signal level of the DC-converted output signal.

The current phase and voltage phase of the AC power are compared to detect the phase difference between the current and voltage phases. Adjusting the drive frequency so as to reduce the detected phase difference allows the drive frequency to track the resonance frequency. As a result, even if the resonance frequency changes, the power transmission efficiency is easily kept constant. Further, ex-post adjustment of the voltage phase or current phase in accordance with the change amount of the output voltage, even if it occurs, causes the drive frequency to change in accordance with the adjusted phase difference. Thus, the feeding power can be feedback-controlled using the drive frequency as a parameter, making it easy to stabilize the output.

The phase detection circuit may compare a first phase value indicating a timing at which the voltage level of the AC power becomes a first reference value and a second phase value indicating a timing at which the current level of the AC power becomes a second reference value to detect the phase difference and change both or one of the first and second reference values in accordance with the signal level to perform ex-post adjustment of both or one of the first and second phase values.

The signal receiving coil may be a single-winding coil. The coil plane of the signal receiving coil and that of the power feeding coil may be substantially the same.

The signal adjustment circuit may extract the output signal component from the AC voltage detected in the signal receiving coil through a band-pass filter.

The power transmission control circuit may make the power feeding coil that does not substantially resonate with circuit elements on the power feeding side feed the AC power to the power receiving coil. The "substantially does not resonate" mentioned here means that the resonance of the power feeding coil is not essential for the wireless power feeding, but does not mean that even an accidental resonance of the power feeding coil with some circuit element is eliminated. A configuration may be possible in which the power feeding coil does not form, together with power feeding side circuit elements, a resonance circuit that resonates with at a resonance point corresponding to the resonance frequency of the power receiving coil. Further, a configuration may be possible in which no capacitor is inserted in series or in parallel to the power feeding coil.

A wireless power receiver according to the present invention receives, at a power receiving coil, AC power fed from the abovementioned wireless power feeder by wireless. The wireless power receiver includes: a receiving coil circuit that includes the power receiving coil and a capacitor; a loading circuit that includes a loading coil that is magnetically coupled to the power receiving coil to receive the AC power from the power receiving coil and a load to which power is supplied from the loading coil; a signal generation circuit that generates an output signal indicating an output voltage applied to a part of the loading circuit by a duty ratio; and a signal transmitting coil that transmits the output signal to the wireless power feeder.

The signal generation circuit may transmit the output signal as a signal indicating a difference value between the output voltage and a reference voltage by the duty ratio.

The signal generation circuit may include a control signal generation circuit that generates a control signal at a control frequency and a comparison circuit that generates an enable signal when a predetermined magnitude relationship is established between the signal level of the control signal and output voltage. The duty ratio of the output signal may be determined based on the duty ratio of the enable signal.

The signal generation circuit may further include a reference signal generation circuit that generates a reference signal having a reference frequency higher than the control frequency. The signal generation circuit may transmit the reference signal as the output signal while the enable signal is being generated.

The signal transmitting coil may be a single-winding coil. The coil plane of the signal transmitting coil and that of the power receiving coil may be substantially the same.

A wireless power transmission system according to the present invention is a system for feeding power by wireless from a power feeding coil to a power receiving coil using a magnetic field resonance phenomenon between the power feeding coil and power receiving coil. The system includes a power transmission control circuit that supplies AC power to the power feeding coil at a drive frequency; a loading circuit that includes a loading coil that is magnetically coupled to the power receiving coil to receive the AC power from the power receiving coil and a load circuit that receives power from the loading coil; a signal generation circuit that generates an output signal indicating an output voltage applied to a part of the loading circuit by a duty ratio; a signal transmitting coil that transmits the generated output signal to the power feeding side; a signal receiving coil that receives the transmitted output signal; a signal adjustment circuit that DC-converts the received output signal in accordance with the duty ratio; and a phase detection circuit that detects a phase difference between voltage and current phases of the AC power. The power transmission control circuit adjusts the drive frequency so as to reduce the phase difference. The phase detection circuit performs ex-post adjustment of the detected value of both or one of the voltage and current phases in accordance with the signal level of the DC-converted output signal.

A wireless power feeder according to the present invention feeds power from a power feeding coil to a power receiving coil by wireless using a magnetic field resonance phenomenon between the power feeding coil and power receiving coil. The wireless power feeder includes: a power feeding coil; a power transmission control circuit that feeds AC power to the power feeding coil at a drive frequency; a phase detection circuit that detects a phase difference between voltage and current phases of the AC power; a signal receiving coil that receives, from the AC power receiving side, an output signal indicating an output level by the magnitude of a signal frequency; and a signal adjustment circuit that DC-converts the output signal in accordance with the signal frequency. The power transmission control circuit adjusts the drive frequency so as to reduce the phase difference. The phase detection circuit performs ex-post adjustment of the detected value of both or one of the voltage and current phases in accordance with the signal level of the DC-converted output signal.

The current phase and voltage phase of the AC power are compared to detect the phase difference between the current and voltage phases. Adjusting the drive frequency so as to reduce the detected phase difference allows the drive frequency to track the resonance frequency. As a result, even if the resonance frequency changes, the power transmission efficiency is easily kept constant. Further, ex-post adjustment of the voltage phase or current phase in accordance with the change amount of the output voltage, even if it occurs, causes the drive frequency to change in accordance with the adjusted phase difference. Thus, the feeding power can be feedback-controlled using the drive frequency as a parameter, making it easy to stabilize the output.

The phase detection circuit may compare a first phase value indicating a timing at which the voltage level of the AC power becomes a first reference value and a second phase value indicating a timing at which the current level of the AC power becomes a second reference value to detect the phase difference and change both or one of the first and second reference values based on the output signal to perform ex-post adjustment of both or one of the first and second phase values.

The signal receiving coil is a single-winding coil. The coil plane of the signal receiving coil and that of the power feeding coil are substantially the same.

The signal adjustment circuit may extract the output signal component from the AC voltage detected in the signal receiving coil through a band-pass filter.

The power transmission control circuit may make the power feeding coil that does not substantially resonate with circuit elements on the power feeding side feed the AC power to the power receiving coil. The "substantially does not resonate" mentioned here means that the resonance of the power feeding coil is not essential for the wireless power feeding, but does not mean that even an accidental resonance of the power feeding coil with some circuit element is eliminated. A configuration may be possible in which the power feeding coil does not form, together with power feeding side circuit elements, a resonance circuit that resonates with at a resonance point corresponding to the resonance frequency of the power receiving coil. Further, a configuration may be possible in which no capacitor is inserted in series or in parallel to the power feeding coil.

A wireless power receiver according to the present invention receives, at a power receiving coil, AC power wirelessly fed from the abovementioned wireless power feeder. The wireless power receiver includes: a receiving coil circuit that includes the power receiving coil and a capacitor; a loading circuit that includes a loading coil that is magnetically coupled to the power receiving coil to receive the AC power from the power receiving coil and a load to which power is supplied from the loading coil; a signal generation circuit that generates an output signal indicating an output voltage applied to a part of the loading circuit by a signal frequency; and a signal transmitting coil that transmits the output signal to the wireless power feeder.

The signal generation circuit may generate the output signal as a signal indicating a difference between the output voltage and a reference voltage by the signal frequency.

The signal transmitting coil is a single-winding coil. The coil plane of the signal transmitting coil and that of the power receiving coil are substantially the same.

A wireless power transmission system according to the present invention is a system for feeding power by wireless from a power feeding coil to a power receiving coil using a magnetic field resonance phenomenon between the power feeding coil and power receiving coil. The system includes: a power transmission control circuit that supplies AC power to the power feeding coil at a drive frequency; a loading circuit that includes a loading coil that is magnetically coupled to the power receiving coil to receive the AC power from the power receiving coil and a load that receives power from the loading coil; a signal generation circuit that generates an output signal indicating an output voltage applied to a part of the loading circuit by a signal frequency; a signal transmitting coil that transmits the generated output signal to the power feeding side; a signal receiving coil that receives the transmitted output signal; a signal adjustment circuit that DC-converts the received output signal in accordance with the signal frequency; and a phase detection circuit that detects a phase difference between voltage and current phases of the AC power. The power transmission control circuit adjusts the drive frequency so as to reduce the phase difference. The phase detection circuit performs ex-post adjustment of the detected value of both or one of the voltage and current phases in accordance with the signal level of the DC-converted output signal.

It is to be noted that any arbitrary combination of the above-described structural components and expressions changed between a method, an apparatus, a system, etc. are all effective as and encompassed by the present embodiments.

According to the present invention, it is possible to easily perform effective control of feeding power in wireless power feeding of a magnetic field resonance type.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be described below with reference to the accompanying drawings.

First Embodiment

Figure 1:
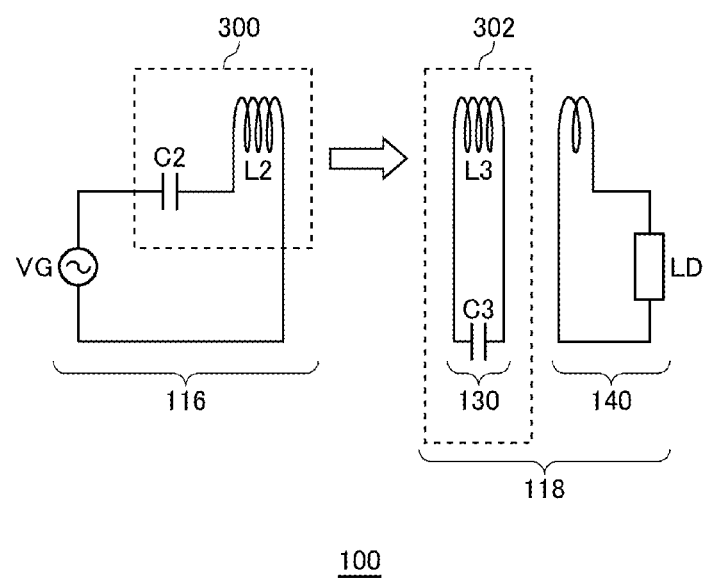
FIG. 1 is a principle view of a wireless power transmission system according to first and third embodiments of the present invention.

FIG. 1 is a view illustrating operation principle of a wireless power transmission system 100 according to a first embodiment and a third embodiment to be described later. The wireless power transmission system 100 includes a wireless power feeder 116 and a wireless power receiver 118. The wireless power feeder 116 includes a power feeding LC resonance circuit 300. The wireless power receiver 118 includes a receiving coil circuit 130 and a loading circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, power feeding coil L2, capacitor C3, and power receiving coil L3 are set such that the resonance frequencies of the power feeding LC resonance circuit 300 and power receiving LC resonance circuit 302 coincide with each other in a state where the power feeding coil L2 and power receiving coil L3 are disposed away from each other far enough to ignore the magnetic field coupling therebetween. This common resonance frequency is assumed to be fr0.

In a state where the power feeding coil L2 and power receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 116 supplies AC power from a power feeding source VG to the power feeding LC resonance circuit 300 at the resonance frequency fr1, the power feeding LC resonance circuit 300 constituting a part of the new resonance circuit resonates at a resonance point 1 (resonance frequency fr1). When the power feeding LC resonance circuit 300 resonates, the power feeding coil L2 generates an AC magnetic field of the resonance frequency fr1. The power receiving LC resonance circuit 302 constituting a part of the new resonance circuit also resonates by receiving the AC magnetic field. When the power feeding LC resonance circuit 300 and power receiving LC resonance circuit 302 resonate at the same resonance frequency fr1, wireless power feeding from the power feeding coil L2 to power receiving coil L3 is performed with the maximum power transmission efficiency. Received power is taken from a load LD of the wireless power receiver 118 as output power. Note that the new resonance circuit can resonate not only at the resonance point 1 (resonance frequency fr1) but also at a resonance point 2 (resonance frequency fr2).

Figure 2:
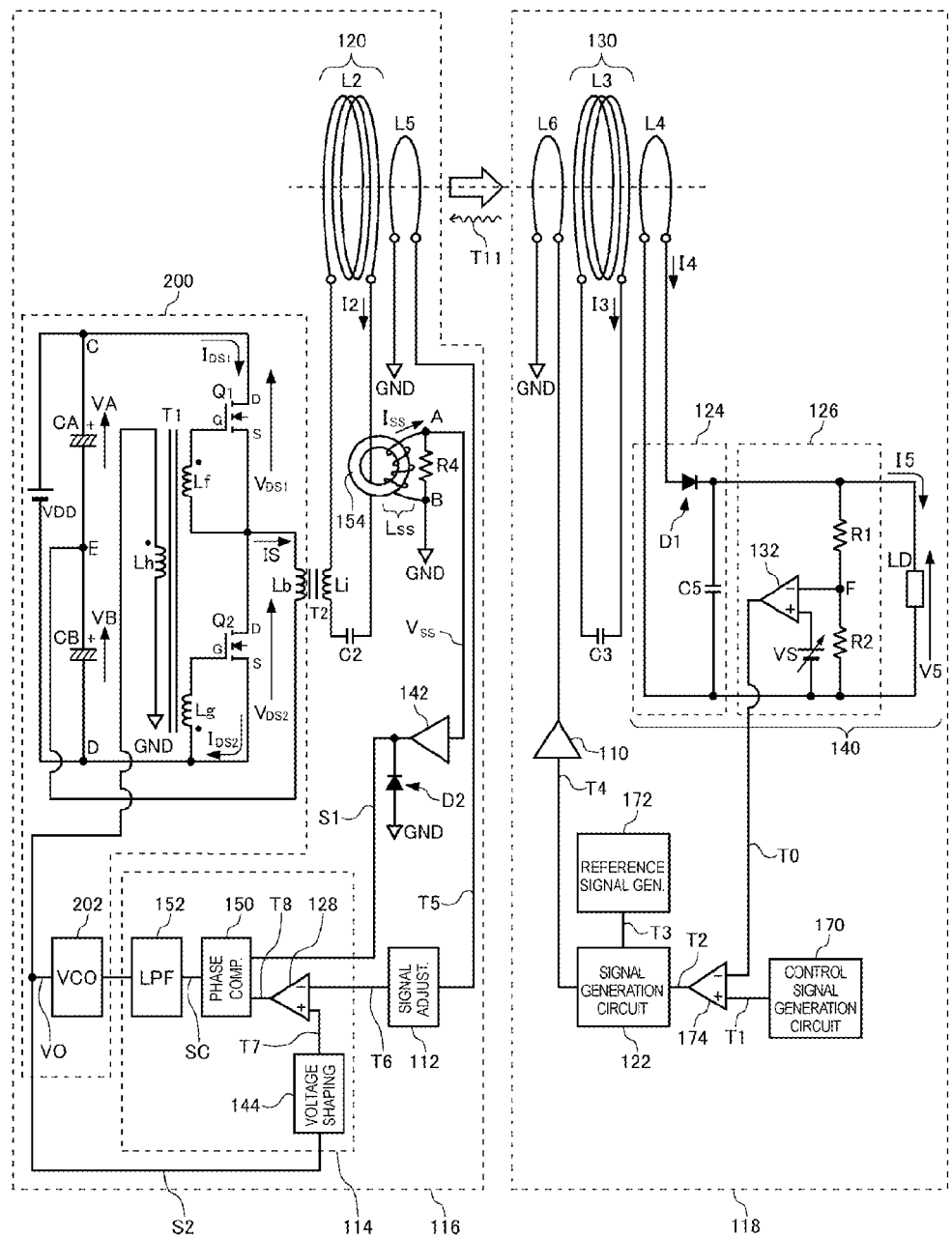
FIG. 2 is a system configuration view of the wireless power transmission system according to the first embodiment.

FIG. 2 is a system configuration view of the wireless power transmission system 100 according to the first embodiment. The wireless power transmission system 100 includes a wireless power feeder 116 and a wireless power receiver 118. The wireless power feeder 116 includes, as basic components, a power transmission control circuit 200, a feeding coil circuit 120, a signal adjustment circuit 112, and a phase detection circuit 114. The wireless power feeder 116 according to the present embodiment directly drives the power feeding coil L2 without intervention of an exciting coil. The wireless power receiver 118 includes, as basic components, a receiving coil circuit 130, a loading circuit 140, a control signal generation circuit 170, a reference signal generation circuit 172, and a signal generation circuit 122.

A distance (hereinafter, referred to as "inter-coil distance") of about 0.2 m to 1.0 m is provided between a power feeding coil L2 of the feeding coil circuit 120 and a power receiving coil L3 of the receiving coil circuit 130. The wireless power transmission system 100 mainly aims to feed power from the power feeding coil L2 to power receiving coil L3 by wireless. In the first embodiment, a description will be made assuming that resonance frequency fr1 is 100 kHz. The wireless power transmission system of the present embodiment may be made to operate in a high-frequency band like ISM (Industry-Science-Medical) frequency band. A low frequency band is advantageous over a high frequency band in reduction of cost of a switching transistor (to be described later) and reduction of switching loss. In addition, the low frequency band is less constrained by Radio Act.

The feeding coil circuit 120 is a circuit in which the power feeding coil L2, capacitor C2, and a transformer T2 secondary coil Li are connected in series. The transformer T2 secondary coil Li constitutes a coupling transformer T2 together with a transformer T2 primary coil Lb and receives AC power from the power transmission control circuit 200 by electromagnetic induction. When power supply voltage is high, large current is likely to flow in the power transmission control circuit 200. Thus, in the transformer T2, the number of windings of the transformer T2 primary coil Lb is set larger than the number of windings of the transformer T2 secondary coil Li.

The number of windings of the power feeding coil L2 is 7, diameter of a conductive wire thereof is 5 mm, and shape of the power feeding coil L2 itself is a square of 280 mm×280 mm. The values of the power feeding coil L2 and capacitor C2 are set such that the resonance frequency fr1 of the power feeding coil circuit 120 is 100 kHz. In FIG. 2, the power feeding coil L2 is represented by a circle for descriptive purpose. Other coils are also represented by circles for the same reason. All the coils illustrated in FIG. 2 are made of copper. AC current I2 flows in the feeding coil circuit 120.

The receiving coil circuit 130 is a circuit in which a power receiving coil L3 and a capacitor C3 are connected in series. The power feeding coil L2 and power receiving coil L3 face each other. The number of windings of the power receiving coil L3 is 7, diameter of a conductive wire is 5 mm, and shape of the power receiving coil L3 itself is a square of 280 mm×280 mm. The values of the power receiving coil L3 and capacitor C3 are set such that the resonance frequency fr of the receiving coil circuit 130 is also 100 kHz. Thus, the power feeding coil L2 and power receiving coil L3 need not have the same shape. When the power feeding coil L2 generates a magnetic field at the resonance frequency fr=100 kHz, the power feeding coil L2 and power receiving coil L3 magnetically resonate, causing large current I3 to flow in the receiving coil circuit 130.

The loading circuit 140 is a circuit in which a loading coil L4 is connected to the load LD through a rectification circuit 124 and a measurement circuit 126. The power receiving coil L3 and loading coil L4 face each other. In the present embodiment, the coil plane of the power receiving coil L3 and that of the loading coil L4 are substantially the same. Thus, the power receiving coil L3 and loading coil L4 are electromagnetically strongly coupled to each other. The number of windings of the loading coil L4 is 1, diameter of a conductive wire thereof is 5 mm, and shape of the loading coil L4 itself is a square of 300 mm×300 mm. When current I3 flows in the power receiving coil L3, an electromotive force occurs in the loading circuit 140 to cause AC current I4 to flow in the loading circuit 140. The AC current I4 is rectified into DC current by the rectification circuit 124. Although part of the DC current flows in the measurement circuit 126, most of the DC current flows in the load LD as DC current I5. The rectification circuit 124 is a general circuit constituted by a diode D1 and a capacitor C5. The details of the measurement circuit 126 will be described later.

The AC power fed from the power feeding coil L2 of the wireless power feeder 116 is received by the power receiving coil L3 of the wireless power receiver 118 and then extracted from the load LD as DC power. Voltage applied to the load LD is referred to as "load voltage V5".

If the load LD is connected in series to the receiving coil circuit 130, the Q-value of the receiving coil circuit 130 is degraded. Therefore, the receiving coil circuit 130 for power reception and loading circuit 140 for power extraction are separated from each other. In order to enhance the power transmission efficiency, the center lines of the power feeding coil L2, power receiving coil L3, and loading coil L4 are preferably made to coincide with one another.

The measurement circuit 126 includes resistors R1 and R2, a control power supply VS, and a comparator 132. The load voltage V5 is divided by the resistors R1 and R2. Voltage applied to both ends of the resistors R2 is referred to as "output voltage". The potential at a connecting point F between the resistors R1 and R2 is input to the negative terminal of the comparator 132 as "measurement potential". A control power supply VS is connected to the positive terminal of the comparator 132. Input voltage at the positive terminal of the comparator 132 generated by the control power supply VS is referred to as "reference potential".

The comparator 132 amplifies a difference (hereinafter, referred to as "correction voltage") between measurement potential and reference potential and outputs the amplified value as a T0 signal. The T0 signal is a DC voltage signal and indicates the magnitude of the correction voltage. In other words, the T0 signal indicates a change amount of the load voltage V5. Although the details will be described later, in the wireless power transmission system 100, the feeding power is controlled so as to make the correction voltage be zero to thereby stabilize the output voltage (load voltage V5). In the present embodiment, the reference potential is set to 2.5 (V). Further, the resistors R1 and R2 are set such that the measurement potential is 2.5 (V) and correction voltage is 0 (V) when the load voltage V5 is 24 (V). The control power supply VS is a variable DC voltage supply, and the voltage thereof can arbitrarily be adjusted.

The control signal generation circuit 170 generates an AC voltage signal T1 of a control frequency fc. The control frequency fc in the present embodiment is 1.0 kHz. The comparator 174 compares the T0 signal and T1 signal and generates a high-level T2 signal (enable signal: AC voltage signal) when the level of the T1 signal is higher than that of the T0 signal (T1>T0). Although details will be described later, the duty ratio of the T2 signal changes depending on the correction voltage. A relationship among the T0 to T2 signals will be described later using FIG. 7.

The reference signal generation circuit 172 generates an AC voltage signal T3 of a reference frequency fs. The reference frequency fs in the present embodiment is 10 MHz, which is considerably higher than the resonance frequency fr1 and control frequency fc. The signal generation circuit 122 generates an AC voltage signal T4 based on the T2 and T3 signals. The T4 signal is an "output signal" indicating the magnitude of the output on the power receiving side. The T4 signal is amplified by an operational amplifier 110 and then transmitted to the wireless power feeder 116 by a signal transmitting coil L6. Based on the T4 signal, the power feeding side can recognize the magnitude of the correction voltage, in other words, a change amount of the load voltage V5.

A configuration of the power transmission control circuit 200 will be described. A VCO (Voltage Controlled Oscillator) 202 is connected to the primary side of the gate-drive transformer T1. The VCO 202 functions as an "oscillator" that generates AC voltage VO at the drive frequency fo. Although the waveform of the AC voltage VO may be a sine wave, it is assumed here that the voltage waveform is a rectangular wave (digital wave). The AC voltage VO causes current to flow in a transformer T1 primary coil Lh alternately in both positive and negative directions. A transformer T1 primary coil Lh, a transformer T1 secondary coil Lf, and a transformer T1 secondary coil Lg constitute a gate-drive coupling transformer T1. Electromagnetic induction causes current to flow also in the transformer T1 secondary coil Lf and transformer T1 secondary coil Lg alternately in both positive and negative directions.

As the VCO 202 in the present embodiment, a built-in unit (product serial number MC14046B) manufactured by Motorola, Inc is used. The VCO 202 also has a function of dynamically changing the drive frequency fo based on phase difference indicating voltage SC fed from the phase comparison circuit 150 (described later in detail).

The following description will be made assuming that the minimum value fo1 of the drive frequency fo is 101 kHz, and the maximum value fo2 thereof is 110 kHz. The appropriate range of the phase difference indicating voltage SC is 1.0 (V) to 4.0 (V). The phase difference indicating voltage SC and drive frequency fo are directly proportional to each other. That is, when the phase difference indicating voltage SC is 1.0 (V), the drive frequency fo (=fo1) is 101 kHz, and when the phase difference indicating voltage SC is 4.0 (V), the drive frequency fo (=fo2) is 110 kHz.

Capacitors CA and CB charged by a DC power supply VDD each serve as a power supply for the power transmission control circuit 200. The capacitor CA is provided between points C and E of FIG. 2, and capacitor CB is provided between points E and D. Assuming that the voltage (voltage between points C and E) of the capacitor CA is VA, voltage (voltage between points E and D) of the capacitor CB is VB, VA+VB (voltage between points C and D) represents input voltage. That is, the capacitors CA and CB each function as a DC voltage supply.

One end of the transformer T1 secondary coil Lf is connected to the gate of a switching transistor Q1, and the other end of the transformer T1 secondary coil Lf is connected to the source of a switching transistor Q1. One end of the transformer T1 secondary coil Lg is connected to the gate of a switching transistor Q2, and the other end of the transformer T1 secondary coil Lg is connected to the source of a switching transistor Q2. When VCO 202 generates AC voltage VO at drive frequency fo, voltage Vx (Vx>0) is alternately applied, at drive frequency fo, to the gates of the switching transistors Q1 and Q2. As a result, the switching transistors Q1 and Q2 are alternately turned on/off at the drive frequency fo. The switching transistors Q1 and Q2 are enhancement type MOS-FET (Metal Oxide Semiconductor Field effect transistor) having the same characteristics but may be other transistors such as a bipolar transistor. Further, other switches such as a relay switch may be used in place of the transistor.

The drain of the switching transistor Q1 is connected to the positive electrode of the capacitor CA. The negative electrode of the capacitor CA is connected to the source of the switching transistor Q1 through the transformer T2 primary coil Lb. The source of the switching transistor Q2 is connected to the negative electrode of the capacitor CB. The positive electrode of the capacitor CB is connected to the drain of the switching transistor Q2 through the transformer T2 primary coil Lb.

Voltage between the source and drain of the switching transistor Q1 is referred to as source-drain voltage VDS1, and voltage between the source and drain of the switching transistor Q2 is referred to as source-drain voltage VDS2. Current flowing between the source and drain of the switching transistor Q1 is referred to as source-drain current IDS1, and current flowing between the source and drain of the switching transistor Q2 is referred to as source-drain current IDS2. The directions of arrows in the diagram indicate the positive directions, and directions opposite to the directions of the arrows indicate the negative directions.

When the switching transistor Q1 is turned conductive (ON), the switching transistor Q2 is turned non-conductive (OFF). A main current path (hereinafter, referred to as "first current path") at this time extends from the positive electrode of the capacitor CA, passes through the point C, switching transistor Q1, transformer T2 primary coil Lb, and point E in this order, and returns to the negative electrode of the capacitor CA. The switching transistor Q1 functions as a switch for controlling conduction/non-conduction of the first current path.

When the switching transistor Q2 is turned conductive (ON), the switching transistor Q1 is turned non-conductive (OFF). A main current path (hereinafter, referred to as "second current path") at this time extends from the positive electrode of the capacitor CB, passes through the point E, transformer T2 primary coil Lb, switching transistor Q2, and point D in this order, and returns to the negative electrode of the capacitor CB. The switching transistor Q2 functions as a switch for controlling conduction/non-conduction of the second current path.

Current flowing in the transformer T2 primary coil Lb in the power transmission control circuit 200 is referred to as "current IS". The current IS is AC current, and the current flow in a first current path is defined as the positive direction and current flow in a second current path is defined as the negative direction.

When the VCO 202 supplies the AC voltage VO at the drive frequency fo, the first and second current paths are switched at the drive frequency fo. Since the AC current IS of the drive frequency fo flows in the transformer T2 primary coil Lb, the AC current I2 flows in the feeding coil circuit 120 at the drive frequency fo. The closer the drive frequency fo is to the resonance frequency fr, the higher the power transmission efficiency becomes. When the drive frequency fo coincides with the resonance frequency fr1, the power feeding coil L2 of the feeding coil circuit 120 and capacitor C2 are in a resonance state. The receiving coil circuit 130 is also a resonance circuit of the resonance frequency fr1, so that the power feeding coil L2 and power receiving coil L3 magnetically resonate. At this time, the maximum transmission efficiency is obtained.

In the case of the first embodiment, however, the resonance frequency fr1 is not included in the operating range of the drive frequency fo, so that the power transmission efficiency does not reach the maximum value. This is because priority is given to the stability of the load voltage V5 over the maximization of the power transmission efficiency. A change in the load voltage V5 can be detected from the correction voltage, so that the wireless power feeder 116 automatically adjusts the drive frequency fo so as to make the correction voltage be zero. The details will be described later.

The resonance frequency fr1 slightly changes depending on use condition or use environment of the feeding coil circuit 120 or receiving coil circuit 130. Further, in the case where the feeding coil circuit 120 or receiving coil circuit 130 is replaced with new one, the resonance frequency fr1 changes. Alternatively, there may be case where the resonance frequency fr1 needs to be changed aggressively by setting the electrostatic capacitance of the capacitor C2 or capacitor C3 variable. Further, according to the experiment made by the present inventor, it has been found that the resonance frequency fr1 starts falling when the distance between the power feeding coil L2 and power receiving coil L3 is made smaller to some extent. When the difference between the resonance frequency fr1 and drive frequency fo changes, the power transmission efficiency changes. When the power transmission efficiency changes, the load voltage V5 also changes. Therefore, in order to stabilize the load voltage V5, it is necessary to keep the difference between the resonance frequency fr1 and the drive frequency fo constant even if the resonance frequency fr1 changes.

A detection coil LSS is provided at the feeding coil circuit 120. The detection coil LSS is a coil wounded around a core 154 (toroidal core) having a penetration hole NS times. The core 154 is formed of a known material such as ferrite, silicon steel, or permalloy. The number of windings NS of the detection coil LSS in the present embodiment is 100.

A part of the current path of the feeding coil circuit 120 penetrates the penetration hole of the core 154. This means that the number of windings NP of the feeding coil circuit 120 with respect to the core 154 is one. With the above configuration, the detection coil LSS and power feeding coil L2 constitute a coupling transformer. An AC magnetic field generated by the AC current I2 of the power feeding coil L2 causes inductive current ISS having the same phase as that of the current I2 to flow in the detection coil LSS. The magnitude of the inductive current ISS is represented by I2·(NP/NS) according to the law of equal ampere-turn.

A resistor R4 is connected to both ends of the detection coil LSS. One end B of the resistor R4 is grounded, and the other end A thereof is connected to a phase comparison circuit 150 through an operational amplifier 142 and the like.

Potential VSS is digitized by the operational amplifier 142 and diode D2 to be an S1 signal. The operational amplifier 142 outputs a saturated voltage of 3.0 (V) when the potential VSS exceeds a first threshold value, e.g., 0.1 (V) and outputs a saturated voltage of −3.0 (V) when the potential VSS falls below a second threshold value, e.g., −0.1 (V). A negative component is cut by the diode D2 and thereby the potential VSS is converted into the S1 signal of a digital waveform. The current I2 and inductive current ISS have the same phase, and the inductive current ISS and potential VSS have the same phase. Further, the AC current IS flowing in the power transmission control circuit 200 and current I2 have the same phase. Therefore, by observing the waveform of the S1 signal, the current phase of the AC current IS can be measured.

When the resonance frequency fr1 and drive frequency fo coincide with each other, the current phase and voltage phase coincide with each other. A deviation between the resonance frequency fr1 and drive frequency fo can be measured from a phase difference between the current phase and voltage phase. The wireless power transmission system 100 according to the present embodiment measures the deviation between the resonance frequency fr1 and drive frequency fo based on the phase difference to thereby make the drive frequency fo automatically track a change of the resonance frequency fr1.

The phase detection circuit 114 includes a voltage shaping circuit 144, a phase comparison circuit 150, and a low-pass filter 152. The low-pass filter 152 is a known circuit and inserted so as to cut a high-frequency component of the phase difference indicating voltage SC. As the phase comparison circuit 150 in the present embodiment, a built-in unit (Phase Comparator) (product serial number MC14046B) manufactured by Motorola is used, as in the case of the VCO 202. Thus, the phase comparison circuit 150 and VCO 202 can be implemented in one chip.

The S1 signal indicating a current phase is input to the phase comparison circuit 150. The AC voltage VO generated by the VCO 202 is input to the phase comparison circuit 150 as an T8 signal indicating a voltage phase after the voltage waveform thereof is shaped by the voltage shaping circuit 144 (to be described later). The phase comparison circuit 150 detects a deviation (phase difference) between the current phase and voltage phase from the S1 and T8 signals and generates the phase difference indicating voltage SC indicating the magnitude of the phase difference. Detecting the phase difference allows detection of the magnitude of the deviation between the resonance frequency fr1 and drive frequency fo. It is possible to keep the phase difference between the drive frequency fo and resonance frequency fr1 constant by controlling the drive frequency fo according to the phase difference indicating voltage SC.

For example, when the drive frequency fo and resonance frequency fr1 deviate from each other, the phase difference is accordingly increased, so that the phase comparison circuit 150 generates the phase difference indicating voltage SC so as to reduce the phase difference. Thus, even if the resonance frequency fr1 changes, it is possible to keep the power transmission efficiency constant to thereby stabilize the load voltage V5. A circuit configuration of the voltage shaping circuit 144 and the signal adjustment circuit 112 will be described later using FIG. 10, and relationship between the S1 and T8 signals will be described later using FIG. 13.

The S2 signal may be obtained by connecting resistors to both ends of the transformer T1 primary coil Lh in parallel to divide the AC voltage VO. Even in the case where the AC voltage VO generated by the VCO 202 is large, the AC voltage can be reduced to a manageable level by the voltage division. The voltage phase may be measured from the source-drain voltages VDS1 and VDS2 or source-gate voltages VGS1 and VGS2.

Even though the resonance frequency fr1 is constant, the load voltage V5 may be changed in some cases. For example, in the case where the load LD is a variable resistor or in the case where the load LD is replaced with new one, the load voltage V5 changes. In the first embodiment, a change in the load voltage V5 is detected as the correction voltage, and the drive frequency fo is automatically adjusted so as to make the correction voltage be zero, whereby the load voltage V5 is stabilized.

The magnitude of the correction voltage is transmitted from the signal transmitting coil L6 to a signal receiving coil L5 as a T11 signal (AC magnetic field signal). The signal receiving coil L5 detects the T11 signal which is an AC magnetic field signal as an AC voltage signal T5 and supplies the signal T5 to the signal adjustment circuit 112. The signal adjustment circuit 112 converts the AC voltage signal T5 into a DC voltage signal T6. The signal level of the T6 signal has a positive correlation with the load voltage V5. The conversion process from the T5 signal into T6 signal will be described in detail later with reference to FIG. 11.

A T7 signal (voltage phase) which is an output of the voltage shaping circuit 144 is input to the positive terminal of the comparator 128, and T6 signal (signal indicating correction voltage) which is an output of the signal adjustment circuit 112 is input to the negative terminal of the comparator 128. The comparator 128 adjusts the phase of the T7 signal using the T6 signal and outputs a T8 signal (AC voltage signal) as a correction voltage phase.

When the load voltage V5 assumes 24 (V), which is a desired value, that is, when the correction voltage is zero, the T6 signal is zero. Accordingly, the phase of the T8 signal and phase of the T7 signal are the same. The phase comparison circuit 150 detects the phase difference between the voltage phase and current phase of the AC power based on the S1 and T8 (=T7) signals and outputs the phase difference indicating voltage SC. The VCO 202 adjusts the drive frequency fo based on the phase difference indicating voltage SC. More specifically, the VCO 202 changes the pulse width of the AC voltage VO to thereby change the drive frequency fo.

Also when the correction voltage is not zero, that is, when the T6 signal is used to perform adjustment, the phase comparison circuit 150 detects the phase difference between the voltage phase and current phase of the AC power based on the S1 and T8 signals and outputs the phase difference indicating voltage SC. However, the T8 signal at this time is a signal obtained by adjusting the phase of the T7 signal using the T6 signal, so that the T8 signal does not indicate the actual voltage phase. The adjustment logic based on the correction voltage will be described in detail later using FIG. 13.

Figure 3:
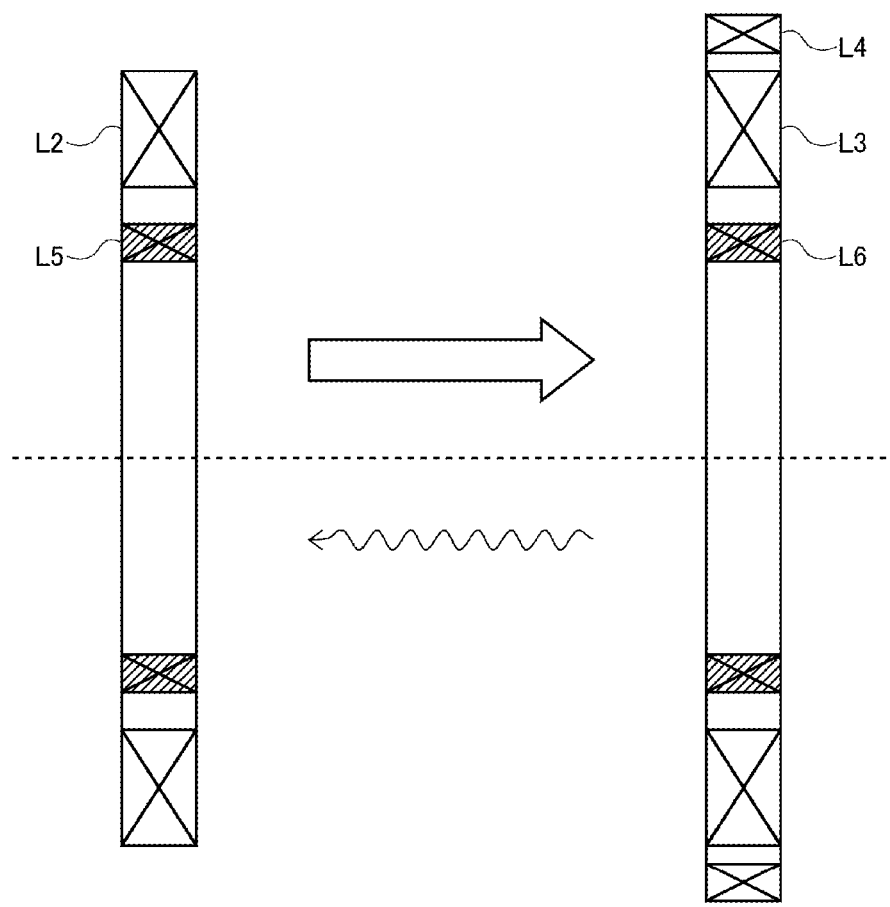
FIG. 3 is a view illustrating structures of the coils in the first embodiment.

FIG. 3 is a view illustrating structures of the coils. On the power feeding side, the signal receiving coil L5 is actually provided inside the power feeding coil L2. In other words, the coil plane of the power feeding coil L2 and that of the signal receiving coil L5 coincide with each other. The power feeding coil L2 is a coil for feeding power to the power receiving coil L3, and the signal receiving coil L5 is a coil for receiving the T11 signal from the signal transmitting coil L6. The number of windings of the signal receiving coil L5 is 1, diameter of a conductive wire thereof is 5 mm, and shape of the signal receiving coil L5 itself is a square of 260 mm×260 mm.

On the power receiving side, the signal transmitting coil L6 is provided inside the power receiving coil L3. Further, the loading coil L4 is provided outside the power receiving coil L3. In other words, the coil plane of the power receiving coil L3, that of the loading coil L4, and that of the signal transmitting coil L6 coincide with each other. The power receiving coil L3 is a coil for receiving power, and the signal transmitting coil L6 is a coil for transmitting the T11 signal. The number of windings of the signal transmitting coil L6 is 1, diameter of a conductive wire thereof is 5 mm, and shape of the signal transmitting coil L6 itself is a square of 260 mm×260 mm.

As described above, in the present embodiment, the central axes of the power feeding coil L2, signal receiving coil L5, loading coil L4, power receiving coil L3, and signal transmitting coil L6 coincide with each other. The signal receiving coil L5 has a simple shape and thus can be formed integrally with the power feeding coil L2 in a compact manner. Similarly, the signal transmitting coil L6 has a simple shape and thus can be formed integrally with the power receiving coil L3 or loading coil L4 in a compact manner.

Figure 4:
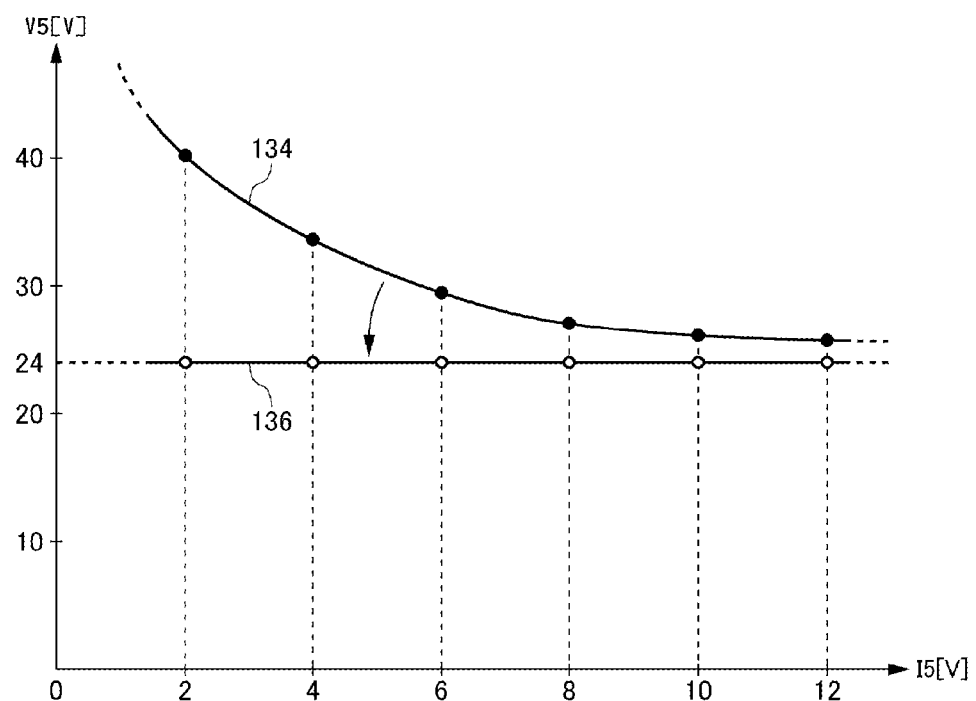
FIG. 4 is a graph illustrating a relationship between load current and load voltage in the first embodiment.

FIG. 4 is a graph illustrating a relationship between load current I5 and load voltage V5. The horizontal axis represents the magnitude of the load current I5 (DC) flowing in the load LD, and the vertical axis represents the load voltage V5. A non-adjustment characteristic 134 represents a current-voltage characteristic obtained in the case where adjustment based on the correction voltage is not performed. In the case of the non-adjustment characteristic 134, when the load LD increases, the load current I5 decreases while the load voltage V5 increases. On the other hand, when the load LD decreases, the load current I5 increases while the load voltage V5 decreases. As described above, when the load LD changes, the load voltage V5 changes even when constant power is fed.

In the case of the non-adjustment characteristic 134, when the load current I5 is 0 (A), the load voltage V5 may increase up to about 60 (V) and, in some cases, may exceed the rated value of the load LD.

The wireless power transmission system 100 in the first embodiment achieves the current-voltage characteristic represented by an adjustment characteristic 136. To be specific, the S1 signal is adjusted based on the correction voltage to change the power transmission efficiency, whereby the load voltage V5 is stabilized.

Figure 5:
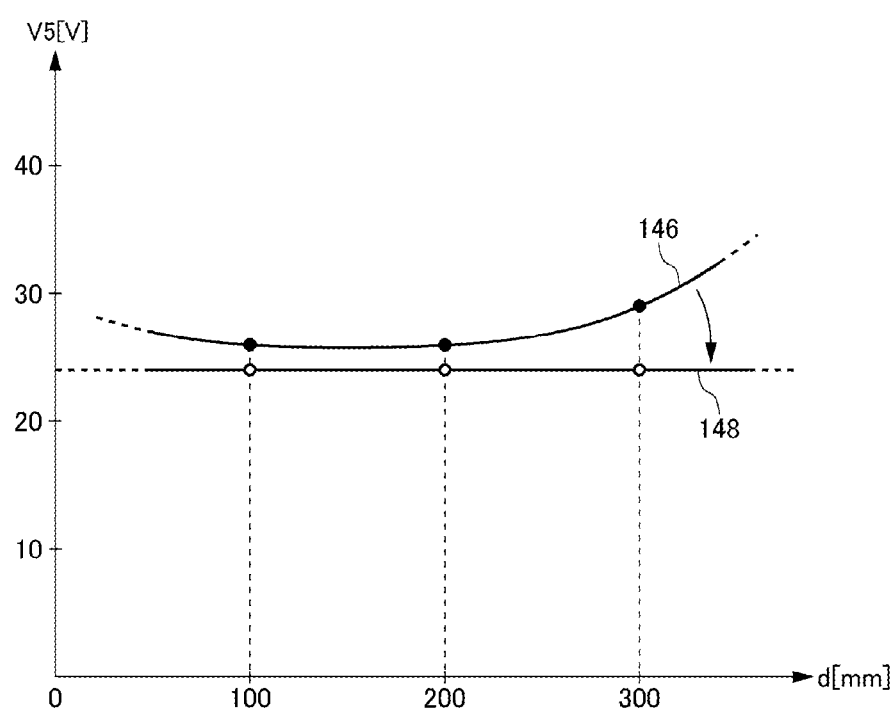
FIG. 5 is a graph illustrating an inter-coil distance and load voltage in the first embodiment.

FIG. 5 is a graph illustrating a relationship between inter-coil distance d and load voltage V5. The horizontal axis represents the inter-coil distance d between the power feeding coil L2 and power receiving coil L3, and the vertical axis represents the load voltage V5. A non-adjustment characteristic 146 represents a voltage-distance characteristic obtained in the case where adjustment based on the correction voltage is not performed. As describe above, the resonance frequency fr1 changes depending on the inter-coil distance d. When the resonance frequency fr1 changes to cause the difference between the drive frequency fo and resonance frequency fr1 to change, the power transmission efficiency changes. Even when the drive frequency fo is made to track the resonance frequency fr1, the load voltage V5 changes to a certain degree depending on the inter-coil distance d.

The wireless power transmission system 100 in the first embodiment achieves the voltage-distance characteristic represented by an adjustment characteristic 148. That is, the T8 signal is adjusted based on the correction voltage to change the power transmission efficiency, whereby the load voltage V5 is stabilized.

Figure 6:
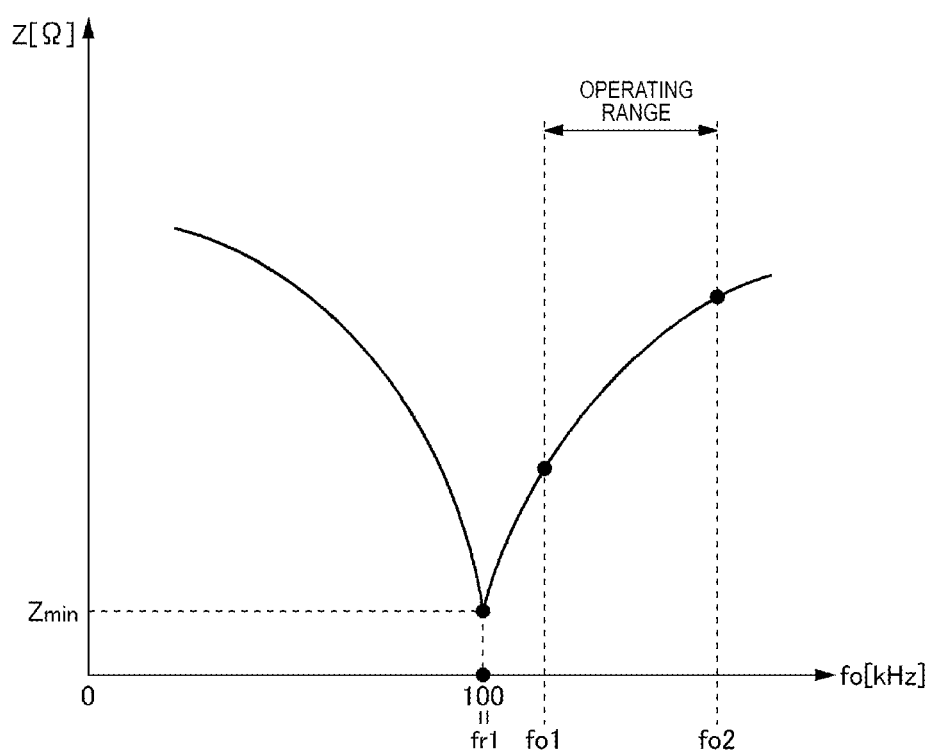
FIG. 6 is a graph illustrating a relationship between the impedance of a feeding coil circuit and drive frequency in the first embodiment.

FIG. 6 is a graph illustrating a relationship between the impedance Z of the power feeding coil circuit 120 and drive frequency fo. The vertical axis represents the impedance Z of the feeding coil circuit 120 (a circuit in which the capacitor C2 and the power feeding coil L2 are connected in series). The horizontal axis represents the drive frequency fo. The impedance Z is a minimum value Zmin at the resonance state. Although Zmin=0 at the resonance state is ideal, Zmin does not become zero in general since some resistance components are included in the feeding coil circuit 120.

When the drive frequency fo and resonance frequency fr1 coincide with each other, the impedance Z becomes minimum and the capacitor C2 and power feeding coil L2 are put in a resonance state. When the drive frequency fo becomes lower than the resonance frequency fr1, capacitive reactance prevails, so that the impedance Z increases and, accordingly, the current phase advances with respect to the voltage phase. On the other hand, when the drive frequency fo becomes higher than the resonance frequency fr1, inductive reactance prevails, so that the impedance Z increases and, accordingly, the current phase delays with respect to the voltage phase.

The impedance Z increases as the deviation from the drive frequency fo and resonance frequency fr1 advances, with the result that the power transmission efficiency is degraded. That is, it is possible to change the power transmission efficiency by changing the difference between the drive frequency fo and resonance frequency fr1.

Figure 7:
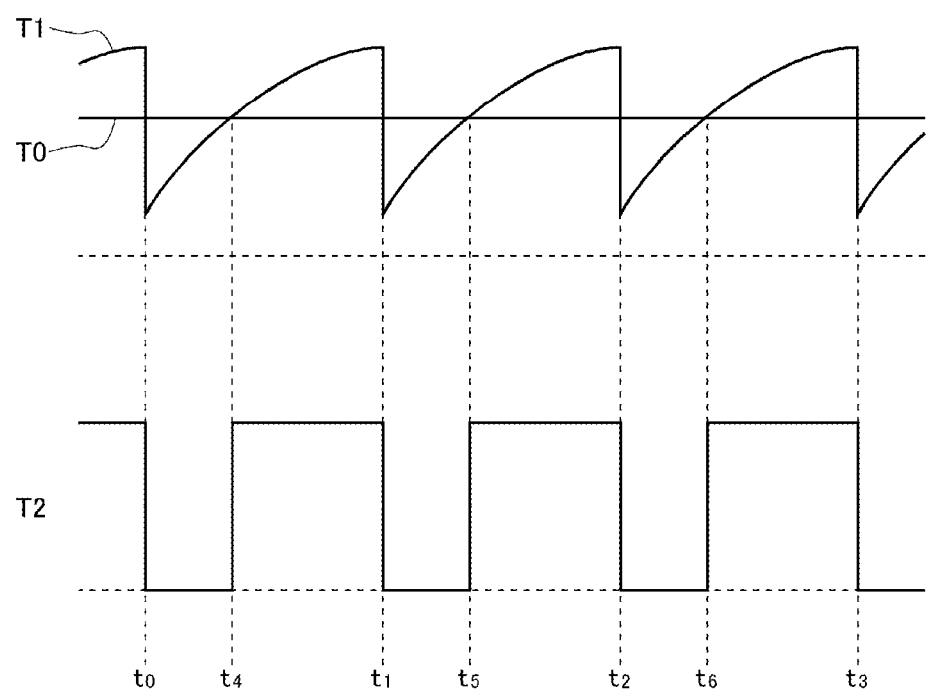
FIG. 7 is a time chart illustrating a relationship among T0, T1, and T2 signals.

FIG. 7 is a time chart illustrating a relationship among the T0 to T2 signals. The T1 signal (control signal) output from the control signal generation circuit 170 is input to the positive terminal of the comparator 174, and the T0 signal output from the measurement circuit 126 is input to the negative terminal of the comparator 174. The T0 signal is a DC voltage signal indicating the correction voltage. The control signal generation circuit 170 generates the AC voltage signal T1 of a saw-tooth waveform at a low frequency (=control frequency fc) of 1.0 kHz.

The T1 signal gradually increases in level from time t0 and abruptly decreases at time t1. The time period from time t0 to time t1 is referred to as "unit period". The same is applied to the time period after the time t1. Since the control frequency fc is 1.0 kHz, the length of each of the unit period is 1.0 (msec).

The T0 signal is a DC voltage signal whose voltage level changes depending on the correction voltage. The comparator 174 compares the T0 signal and T1 signal and generates the high-level T2 signal when the level of the T1 signal is higher than that of the T0 signal (T1>T0) while the comparator 174 generates the low-level T2 signal when the level of the T1 signal is not higher than that of the T0 signal (T1≤T0). Among the unit period from t0 to t1, the T2 signal assumes a low level from time t0 to t4 and assumes a high level from time t4 to t1. That is, among the unit period from time t0 to t1, the time period from time t0 to t4 is the disable period, and time period from time t4 to t1 is enable period. The level of the T0 signal changes based on the correction voltage, causing the duty ratio of the T2 signal to change. When the load voltage V5 increases, the correction potential decreases, with the result that the duty ratio of the T2 signal increases. Conversely, when the load voltage V5 decreases, the correction potential increases, with the result that the duty ratio of the T2 signal decreases. That is, the higher the load voltage V5, the higher the duty ratio of the T2 signal becomes. In the present embodiment, a setting has been made such that the duty ratio does not reach 100% even if the correction potential becomes zero.

Figure 8:
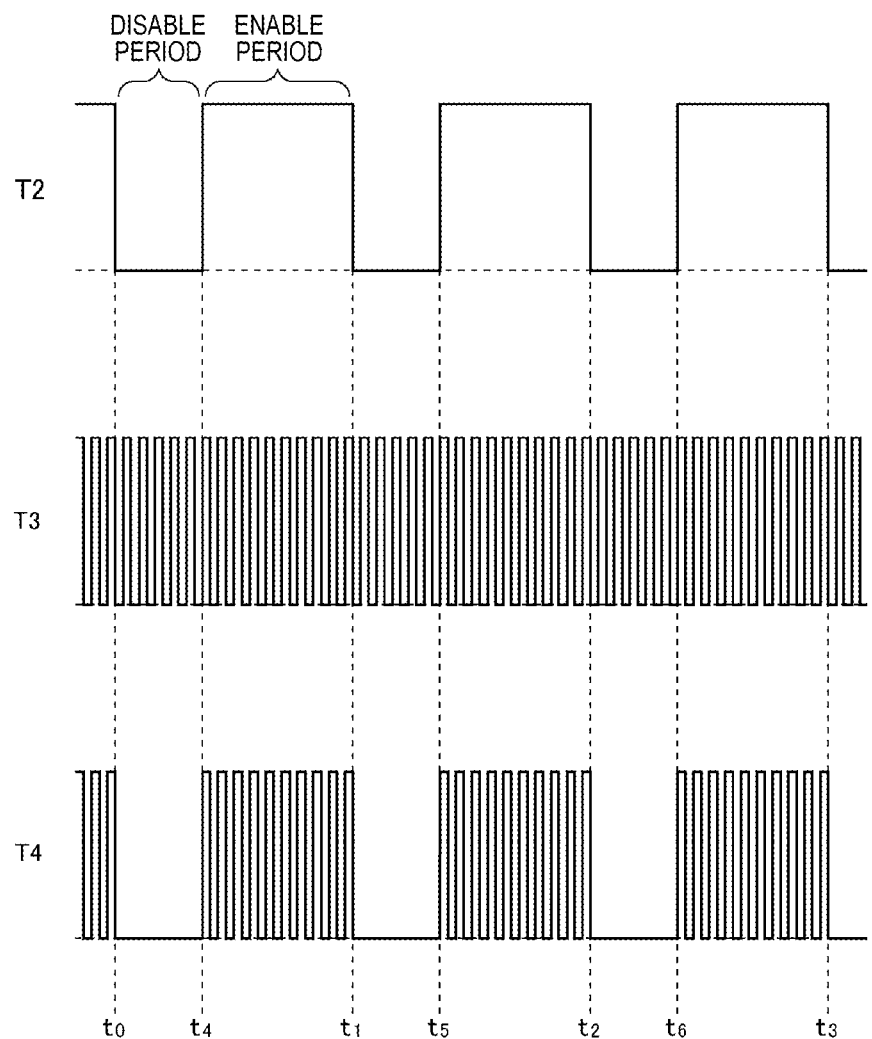
FIG. 8 is a time chart illustrating a relationship among T2, T3, and T4 signals.

FIG. 8 is a time chart illustrating a relationship among the T2, T3, and T4 signals. As described using FIG. 7, the T2 signal (enable signal) is an AC voltage signal having a control frequency fc of 1.0 kHz in which each of the time periods from t0 to t1, t1 to t2, . . . , is set as the unit period. The time period during which the T2 signal assumes a high level is the enable period, and time period during which the T2 signal assumes a low level is the disable period. The T3 signal is an AC voltage signal having a high frequency (=reference frequency fs) of 10 MHz. It is assumed here that the T3 signal has a rectangular waveform (digital waveform) although it may have a sine waveform. The signal generation circuit 122 passes the T3 signal therethrough as the T4 signal only during the enable period. That is, the logical AND between the T2 and T3 signals corresponds to the T4 signal.

The T4 signal which is an AC voltage signal is amplified by the operational amplifier 110 and is transmitted, as the T11 signal, from the signal transmitting coil L6 to the signal receiving coil L5. The duty ratio between the enable period and disable period changes depending on the correction voltage. The lower the correction voltage (the higher the load voltage V5) is, the longer the enable period becomes. The ratio of the enable period relative to the entire unit period is referred to as "duty ratio of T11 signal (output signal)".

Figure 9:
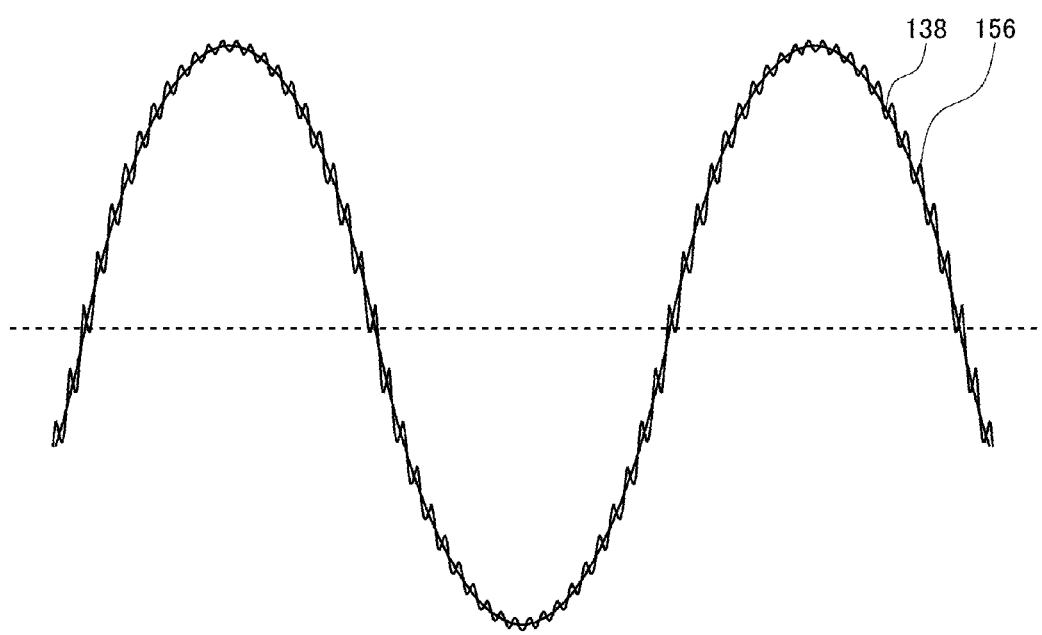
FIG. 9 is a view schematically illustrating a waveform of an electromagnetic field generated between power feeding and power receiving coils.

FIG. 9 is a view schematically illustrating a waveform of an electromagnetic field generated between the power feeding coil L2 and power receiving coil L3. A power waveform 138 represents the waveform of an AC power fed from the power feeding coil L2 to the power receiving coil L3. The frequency of the power waveform 138 is about the resonance frequency fr1 (=100 kHz). A signal frequency 156 represents the waveform of the T11 signal transmitted from the signal transmitting coil L6 to signal receiving coil L5. The frequency of the signal waveform 156 is the reference frequency fs (=10 MHz). However, the T11 signal includes a signal component of the reference frequency fs only during the enable period. The control frequency fc (=1.0 kHz) specifying the duty ratio of the T11 signal is considerably lower than the resonance frequency fr1 (=100 kHz).

As described above, an electromagnetic field in which the power waveform 138 and signal waveform 156 have been superimposed on each other is generated between the power feeding coil L2 and power receiving coil L3. Thus, it is necessary to extract only the output signal (T11 signal) from the voltage signal received by the signal receiving coil L5.

Figure 10:
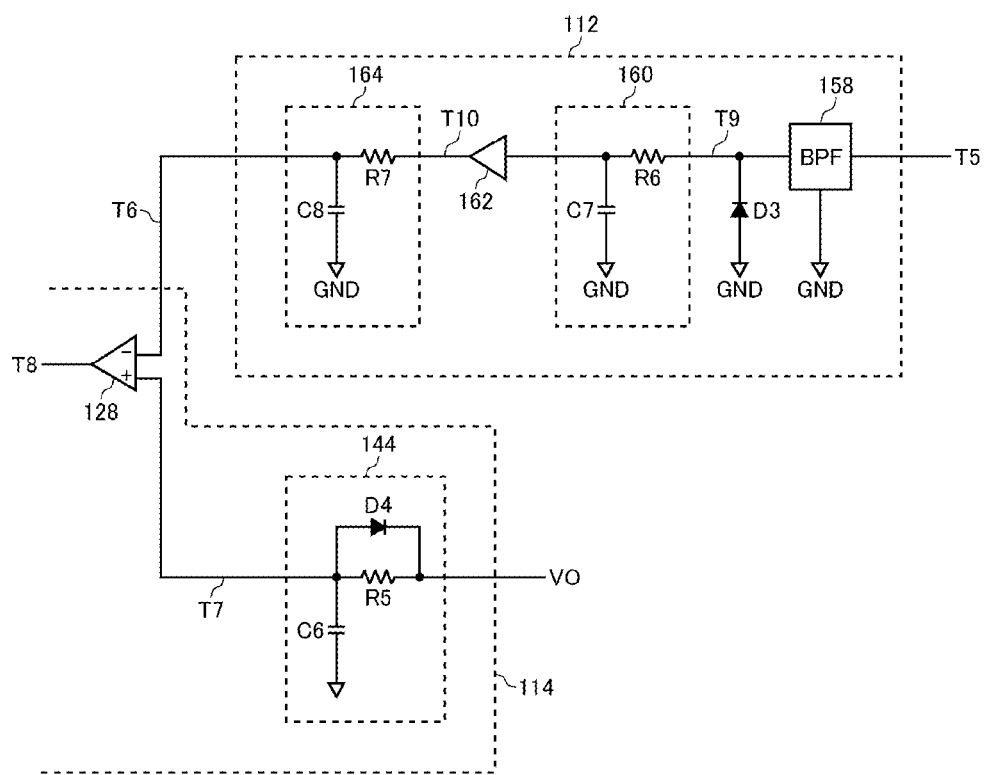
FIG. 10 is a circuit diagram of a voltage shaping circuit and a signal adjustment circuit.

FIG. 10 is a circuit diagram of the voltage shaping circuit 144 and signal adjustment circuit 112. The AC voltage VO is shaped into the T7 signal of a saw-tooth waveform by the voltage shaping circuit 144. In the voltage shaping circuit 144, a resistor R5 is inserted in the path of the T7 signal, and a diode D4 is connected in parallel to the resistor R5. The path of the T7 signal is grounded through a capacitor C6. The T7 signal is input to the positive terminal of the comparator 128. The T7 signal is a signal indicating the original voltage phase.

From the T5 signal in which the power waveform 138 and signal waveform 156 have been superimposed on each other, only the reference frequency fs component is extracted by a band-pass filter 158. The negative component of the extracted component is cut by a diode D3 to obtain a T9 signal. The band-pass filter 158 is a ceramic filter that utilizes mechanical resonance.

The T9 signal is smoothed by a smoothing circuit 160 and then amplified by an operation amplifier 162 to become a T10 signal. The T10 signal is smoothed by a smoothing circuit 164 and, finally, becomes a DC voltage signal T6. The smoothing circuit 160 includes a resistor R6 and a capacitor C7. The smoothing circuit 164 includes a resistor R7 and a capacitor C8. The resistor R7 and capacitor C8 are selected so as to make the time constant of the smoothing circuit 164 larger than that of the smoothing circuit 160.

Figure 11:
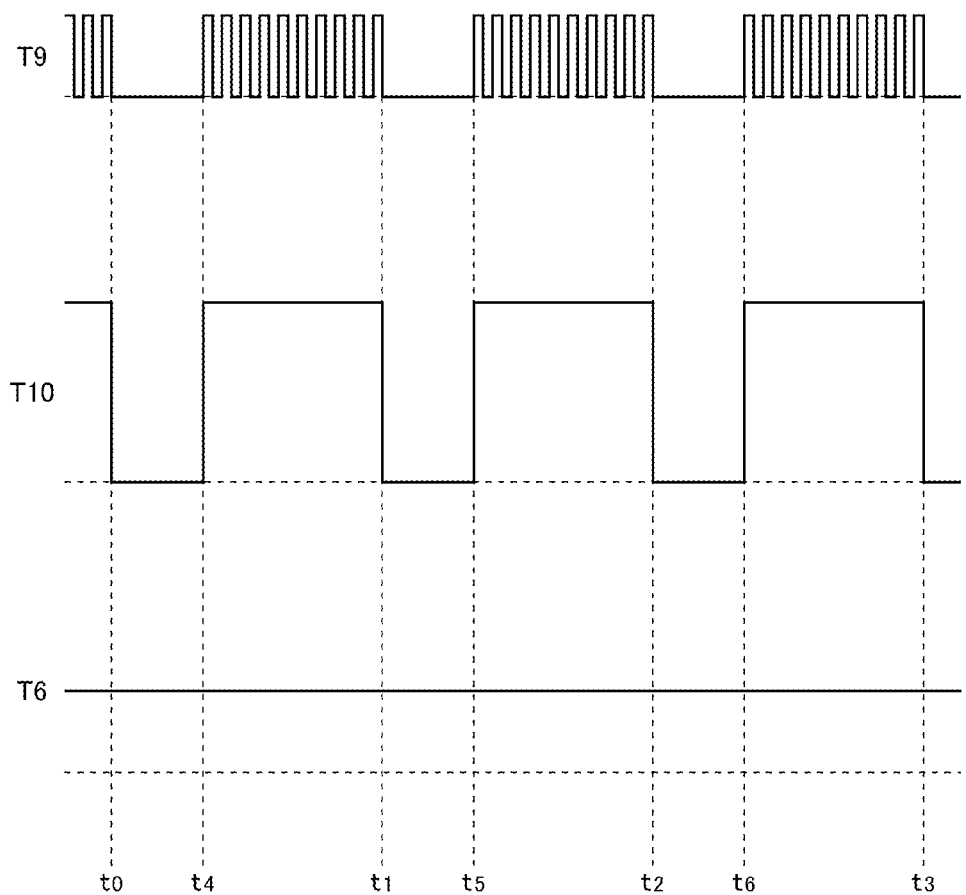
FIG. 11 is a time chart illustrating a relationship among T9, T10, and T6 signals.

FIG. 11 is a time chart illustrating a relationship among the T9, T10, and T6 signals. The T9 signal is a signal obtained by extracting the reference frequency fs component from the T5 signal and cutting the negative component of the extracted component. The T9 signal has a signal waveform that reproduces the T4 signal to be transmitted. However, the amplitude of the T9 signal is smaller than that of the T4 signal due to transmission loss.

The smoothing circuit 160 smoothes the T9 signal to generate T10 signal. The T10 signal is a signal that reproduces the T2 signal. Further, the smoothing circuit 164 smoothes the T10 signal to generate the T6 signal. The higher the duty ratio of the T10 signal, in other words, the higher the duty ratio of the T2 signal, the higher the signal level of the T6 signal becomes.

When taken together, the higher the load voltage V5, the higher the correction voltage becomes, which increases the voltage level input to the negative terminal of the comparator 132. As a result, the signal level of the T0 signal (DC voltage signal) becomes low. When the signal level of the T0 signal becomes low, the duty ratio of the T2 signal increases, resulting in an increase in the signal level of the T6 signal (DC voltage signal).

Figure 12:
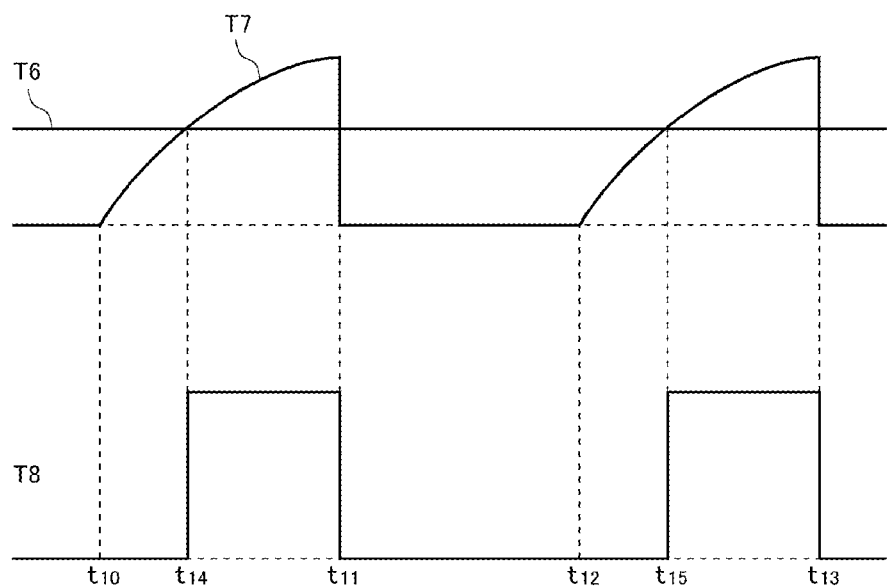
FIG. 12 is a time chart illustrating a relationship among T6, T7, and T8 signals.

FIG. 12 is a time chart illustrating a relationship among the T6, T7, and T8 signals. The VO signal, which is a digital signal, is shaped into the T7 signal of a saw-tooth waveform by the voltage shaping circuit 144. The T7 signal is an AC voltage signal of the drive frequency fo and indicates a voltage phase. The level of the T7 signal starts increasing at time t10 and abruptly decreases at time t11. The time period from time t10 to time t11 corresponds to the unit period of the T7 signal (VO signal). Since the drive frequency fo is 101 to 109 kHz, the time length of the unit period is about 0.01 (msec).

The T6 signal is a DC voltage signal whose voltage level changes depending on the correction voltage. The comparator 128 compares the T6 signal and T7 signal and generates the high-level T8 signal when the level of the T7 signal is higher than that of the T6 signal (T7>T6) while the comparator 128 generates the low-level T8 signal when the level of the T7 signal is not higher than that of the T6 signal (T7 T6). Among the unit period from t10 to t11, the T8 signal assumes a low level from time t10 to t14 and assumes a high level from time t14 to t11. The level of the T6 signal changes based on the correction voltage, causing the duty ratio of the T8 signal to change. As described above, when the load voltage V5 increases, the signal level of the T6 signal increases. As a result, the duty ratio of the T8 signal decreases, and the rising time of the T8 signal occurs later than that of the T7 signal (voltage signal VO).

When the correction voltage is zero and thus adjustment is not required, the signal level of the T6 signal decreases to near zero. In this case, the rising time of the T8 signal is substantially the same as that of the T7 signal.

Figure 13:
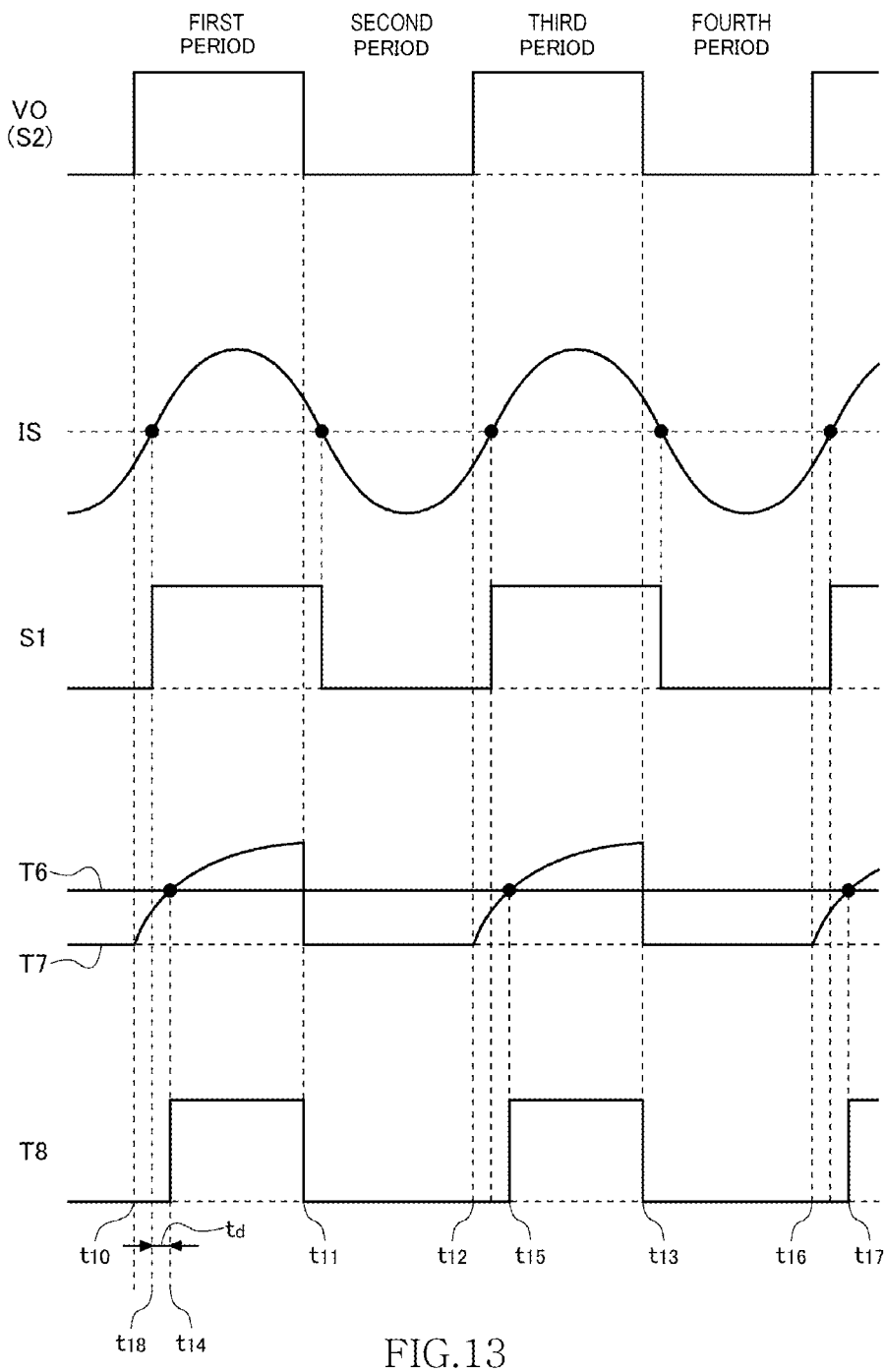
FIG. 13 is a time chart illustrating a relationship between an S1 signal and T8 signal.

FIG. 13 is a time chart illustrating a relationship between the S1 signal and T8 signal. Time period from time t10 to time t11 (hereinafter, referred to as "first period") is a time period during which the switching transistor Q1 is ON while the switching transistor Q2 is OFF. Time period from time t11 to time t12 (hereinafter, referred to as "second period") is a time period during which the switching transistor Q1 is OFF while the switching transistor Q2 is ON. Time period from time t12 to time t13 (hereinafter, referred to as "third period") is a time period during which the switching transistor Q1 is ON while the switching transistor Q2 is OFF. Time period from time t13 to time t14 (hereinafter, referred to as "fourth period") is a time period during which the switching transistor Q1 is OFF while the switching transistor Q2 is ON.

At time t10, the AC voltage VO (S2 signal) changes from the minimum value to the maximum value. At time t11 at which the first time period is ended, the AC voltage VO (S2 signal) changes from the maximum value to the minimum value. Hereinafter, a timing (represented by, e.g., time t10) at which the S2 signal rises is referred to as "voltage phase value".

In the case where the drive frequency fo is higher than the resonance frequency fr1, an inductance reactance component appears in the impedance Z of the feeding coil circuit 120 (LC resonance circuit), and the current phase of the current IS delays with respect to the voltage phase. Thus, the S1 signal indicating the current phase rises at time t18 which is later than time t10. Hereinafter, a timing (represented by, e.g., time t18) at which the S1 signal rises is referred to as "current phase value". In the example of FIG. 13, a value obtained by t10−t18 represents the phase difference. Here, t10−t18<0 is established, so that the current phase delays with respect to the voltage phase.

When the S2 signal rises at time t10, the level of the T7 signal starts increasing. At time t11 at which the level of the S2 signal assumes a low level, the level of the S7 signal also abruptly decreases.

The T6 signal is a DC voltage signal whose level changes depending on the magnitude of the correction voltage. In FIG. 13, the correction voltage is detected, that is, the load voltage V5 deviates from a desired value.

The T7 signal and T6 signal are input to the positive terminal and negative terminal of the comparator 128, respectively, and the T8 signal is output from the comparator 128. When the level of the T7 signal is higher than that of T6 signal (T7>T6), the T8 signal assumes a high level, while when the level of the T7 signal is not higher than that of T6 signal (T7≤T6), the T8 signal assumes a low level. In FIG. 13, the level of the T7 signal is higher than that of the T6 signal (T7>T6) at time t14 (hereinafter, such a timing is referred to also as "voltage phase value after correction") which is later than time t10. The voltage level of the T6 signal serves as a "reference value" for determining the voltage phase value after correction.

The phase comparison circuit 150 compares rising time t18 of the S1 signal and rising time t14 of the T8 signal to calculate a phase difference td. Although the actual phase difference is obtained by t10−t18 (<0), the phase difference recognized by the phase comparison circuit 150 is obtained by t14−t18 (>0). The phase comparison circuit 150 outputs the phase difference indicating voltage SC corresponding to a value obtained by t14−t18. The VCO 202 determines that the current phase advances with respect to the voltage phase based on the phase difference td although actually the current phase delays with respect to the voltage phase. In other words, the VCO 202 determines that the drive frequency fo is lower than the resonance frequency fr1 and tries to eliminate the phase difference by increasing the drive frequency fo. As a result, feedback control is effected such that the power transmission efficiency is degraded, the load voltage V5 is reduced, and the signal level of the T6 signal is reduced so as to eliminate the phase difference.

For example, when the resistance value of the load LD increases, the load current I5 decreases, while the load voltage V5 increases (refer to FIG. 4). When the load voltage V5 increases, the measurement potential increases, while the voltage level of the T0 signal (DC voltage signal) decreases.

When the voltage level of the T0 signal decreases, the duty ratio of the T2 signal increases (refer to FIG. 7). As a result, the duty ratio of the T4 signal (output signal) also increases (refer to FIG. 8). When the duty ratio of the T4 signal increases, the voltage level of the T6 signal (DC voltage signal) increases, with the result that the phase (voltage phase after correction) of the T8 signal delays. The rising time (current phase) of the S1 signal is earlier than the rising time (voltage phase after correction) of the T8 signal, so that the phase comparison circuit 150 recognizes that current phase advances with respect to the voltage phase. In order to delay the current phase, the phase comparison circuit 150 issues the phase difference indicating voltage SC to the VCO 202 so as to make the VCO 202 increase the drive frequency fo. Then, the deviation between the resonance frequency fr1 and drive frequency fo becomes larger to cause the power transmission efficiency to decrease (refer to FIG. 6), with the result that the load voltage V5 decreases. With such feedback control, the load voltage V5 can be kept at a fixed value. The same feedback control is performed when the load voltage V5 decreases.

Even when the signal level of the T6 signal decreases, the voltage phase value after correction does not advance with respect to the voltage phase value before correction. Therefore, the drive frequency fo is controlled within a range higher than the resonance frequency fr1 and thus stable control can be achieved.

Second Embodiment

Figure 14:
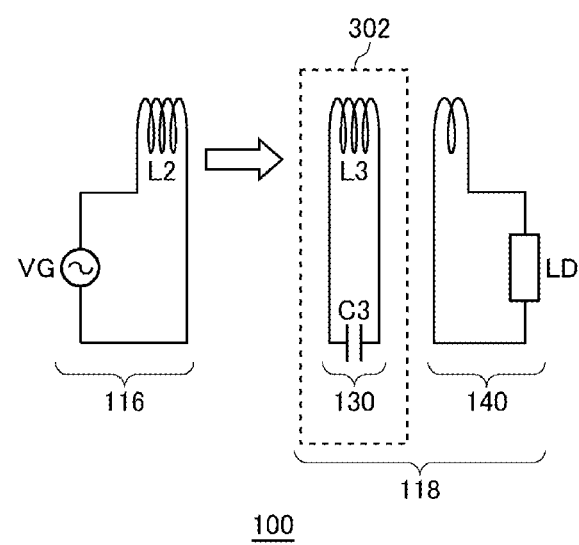
FIG. 14 is a view illustrating operation principle of the wireless power transmission system according to second and fourth embodiments.

FIG. 14 is a view illustrating operation principle of the wireless power transmission system 100 according to a second embodiment and a fourth embodiment to be described later. As in the case of the first embodiment, the wireless power transmission system 100 according to the second embodiment includes the wireless power feeder 116 and wireless power receiver 118. However, although the wireless power receiver 118 includes the power receiving LC resonance circuit 302, the wireless power feeder 116 does not include the power feeding LC resonance circuit 300. That is, the power feeding coil L2 does not constitute a part of the LC resonance circuit. More specifically, the power feeding coil L2 does not form any resonance circuit with other circuit elements included in the wireless power feeder 116. No capacitor is connected in series or in parallel to the power feeding coil L2. Thus, the power feeding coil L2 does not resonate in a frequency at which power transmission is performed.

The power feeding source VG supplies AC current of the resonance frequency fr1 to the power feeding coil L2. The power feeding coil L2 does not resonate but generates an AC magnetic field of the resonance frequency fr1. The power receiving LC resonance circuit 302 resonates by receiving the AC magnetic field. As a result, large AC current flows in the power receiving LC resonance circuit 302. Studies conducted by the present inventor have revealed that formation of the LC resonance circuit is not essential in the wireless power feeder 116. The power feeding coil L2 does not constitute a part of the power feeding LC resonance circuit, so that the wireless power feeder 116 does not resonate at the resonance frequency fr1. It has been generally believed that, in the wireless power feeding of a magnetic field resonance type, making resonance circuits which are formed on both the power feeding side and power receiving side resonate at the same resonance frequency fr1 (=fr0) allows power feeding of large power. However, it is found that even in the case where the wireless power feeder 116 does not contain the power feeding LC resonance circuit 300, if the wireless power receiver 118 includes the power receiving LC resonance circuit 302, the wireless power feeding of a magnetic field resonance type can be achieved.

Even when the power feeding coil L2 and power receiving coil L3 are magnetic-field-coupled to each other, a new resonance circuit (new resonance circuit formed by coupling of resonance circuits) is not formed due to absence of the capacitor C2. In this case, the stronger the magnetic field coupling between the power feeding coil L2 and power receiving coil L3, the greater the influence exerted on the resonance frequency of the power receiving LC resonance circuit 302. By supplying AC current of this resonance frequency, that is, a frequency near the resonance frequency fr1 to the power feeding coil L2, the wireless power feeding of a magnetic field resonance type can be achieved. In this configuration, the capacitor C2 need not be provided, which is advantageous in terms of size and cost.

Figure 15:
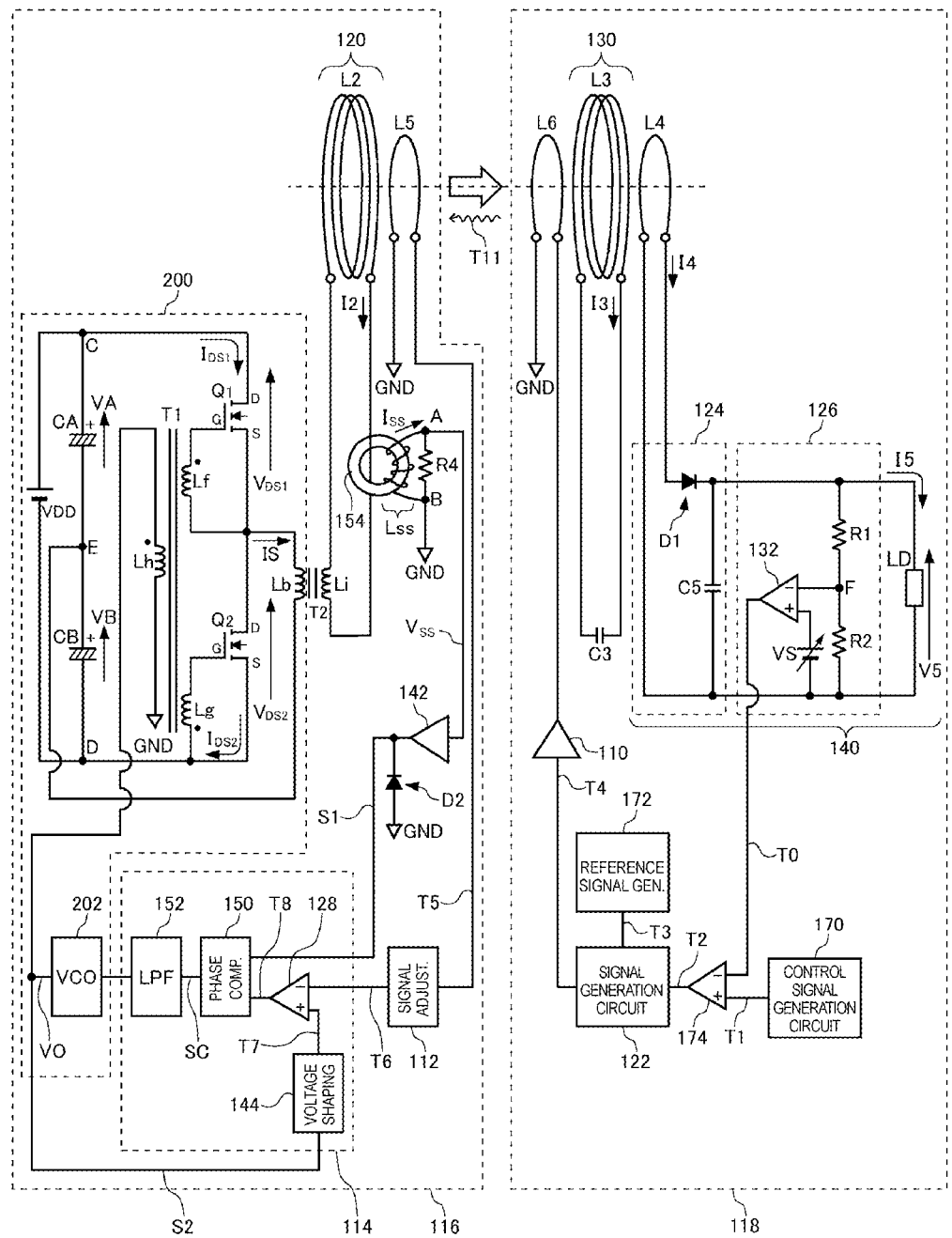
FIG. 15 is a system configuration view of the wireless power transmission system according to the second embodiment.

FIG. 15 is a system configuration view of the wireless power transmission system 100 according to the second embodiment. In the wireless power transmission system 100 of the second embodiment, the capacitor C2 is omitted. Other points are the same as the first embodiment.

Third Embodiment

Figure 16:
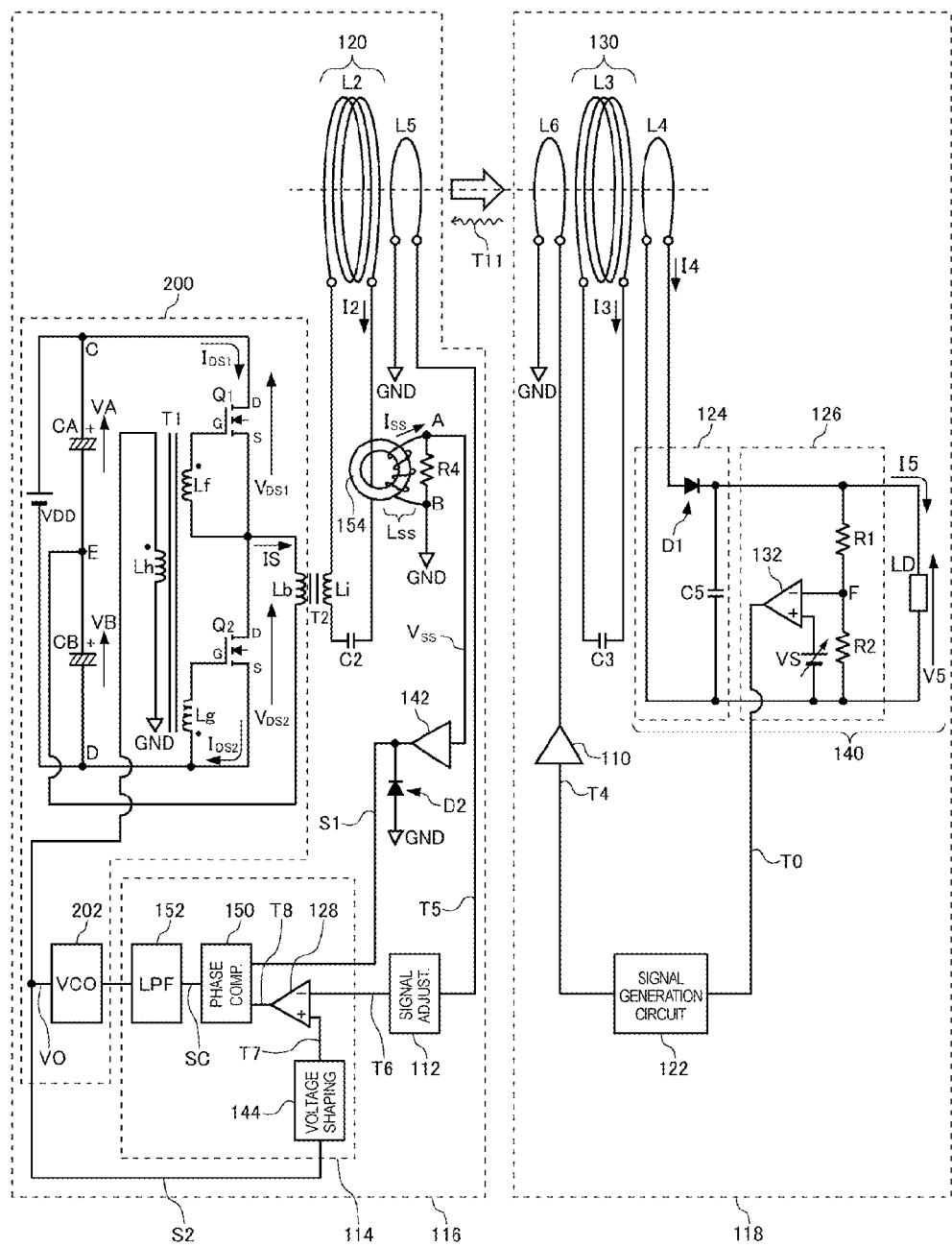
FIG. 16 is a system configuration view of the wireless power transmission system according to the third embodiment.

FIG. 16 is a system configuration view of the wireless power transmission system 100 according to a third embodiment. The wireless power transmission system 100 of the third embodiment operates based on the operational principle described using FIG. 1. That is, the power feeding coil L2 supplies AC power of the resonance frequency fr1 to the power receiving coil L3 while resonating at the resonance frequency fr1. The wireless power transmission system 100 includes the wireless power feeder 116 and wireless power receiver 118. The wireless power feeder 116 includes, as basic components, the power transmission control circuit 200, feeding coil circuit 120, signal adjustment circuit 112, and phase detection circuit 114. The wireless power receiver 118 includes, as basic components, the receiving coil circuit 130, loading circuit 140, and signal generation circuit 122. The wireless power feeder 116 according to the third embodiment also directly drives the power feeding coil L2 without intervention of an exciting coil.

A distance (hereinafter, referred to as "inter-coil distance") of about 0.2 m to 1.0 m is provided between a power feeding coil L2 of the feeding coil circuit 120 and a power receiving coil L3 of the receiving coil circuit 130. The wireless power transmission system 100 mainly aims to feed power from the power feeding coil L2 to power receiving coil L3 by wireless. In the first embodiment, a description will be made assuming that resonance frequency fr is 100 kHz. The wireless power transmission system of the present embodiment may be made to operate in a high-frequency band like ISM (Industry-Science-Medical) frequency band. A low frequency band is advantageous over a high frequency band in reduction of cost of a switching transistor (to be described later) and reduction of switching loss. In addition, the low frequency band is less constrained by Radio Act.

The feeding coil circuit 120 is a circuit in which the power feeding coil L2, capacitor C2, and a transformer T2 secondary coil Li are connected in series. The transformer T2 secondary coil Li constitutes a coupling transformer T2 together with a transformer T2 primary coil Lb and receives AC power from the power transmission control circuit 200 by electromagnetic induction. When power supply voltage is high, large current is likely to flow in the power transmission control circuit 200. Thus, in the transformer T2, the number of windings of the transformer T2 primary coil Lb is set larger than the number of windings of the transformer T2 secondary coil Li.

The number of windings of the power feeding coil L2 is 7, diameter of a conductive wire thereof is 5 mm, and shape of the power feeding coil L2 itself is a square of 280 mm×280 mm. The values of the power feeding coil L2 and capacitor C2 are set such that the resonance frequency fr1 of the power feeding coil circuit 120 is 100 kHz. In FIG. 16, the power feeding coil L2 is represented by a circle for descriptive purpose. Other coils are also represented by circles for the same reason. All the coils illustrated in FIG. 16 are made of copper. AC current I2 flows in the feeding coil circuit 120.

The receiving coil circuit 130 is a circuit in which a power receiving coil L3 and a capacitor C3 are connected in series. The power feeding coil L2 and power receiving coil L3 face each other. The number of windings of the power receiving coil L3 is 7, diameter of a conductive wire is 5 mm, and shape of the power receiving coil L3 itself is a square of 280 mm×280 mm. The values of the power receiving coil L3 and capacitor C3 are set such that the resonance frequency fr of the receiving coil circuit 130 is also 100 kHz. Thus, the power feeding coil L2 and power receiving coil L3 need not have the same shape. When the power feeding coil L2 generates a magnetic field at the resonance frequency fr=100 kHz, the power feeding coil L2 and power receiving coil L3 magnetically resonate, causing large current I3 to flow in the receiving coil circuit 130.

The loading circuit 140 is a circuit in which a loading coil L4 is connected to the load LD through a rectification circuit 124 and a measurement circuit 126. The power receiving coil L3 and loading coil L4 face each other. In the present embodiment, the coil plane of the power receiving coil L3 and that of the loading coil L4 are substantially the same. Thus, the power receiving coil L3 and loading coil L4 are electromagnetically strongly coupled to each other. The number of windings of the loading coil L4 is 1, diameter of a conductive wire thereof is 5 mm, and shape of the loading coil L4 itself is a square of 300 mm×300 mm. When current I3 flows in the power receiving coil L3, an electromotive force occurs in the loading circuit 140 to cause AC current I4 to flow in the loading circuit 140. The AC current I4 is rectified into DC current by the rectification circuit 124. Although part of the DC current flows in the measurement circuit 126, most of the DC current flows in the load LD as DC current I5. The rectification circuit 124 is a general circuit constituted by a diode D1 and a capacitor C5. The details of the measurement circuit 126 will be described later.

The AC power fed from the power feeding coil L2 of the wireless power feeder 116 is received by the power receiving coil L3 of the wireless power receiver 118 and then extracted from the load LD as DC power. Voltage applied to the load LD is referred to as "load voltage V5".

If the load LD is connected in series to the receiving coil circuit 130, the Q-value of the receiving coil circuit 130 is degraded. Therefore, the receiving coil circuit 130 for power reception and loading circuit 140 for power extraction are separated from each other. In order to enhance the power transmission efficiency, the center lines of the power feeding coil L2, power receiving coil L3, and loading coil L4 are preferably made to coincide with one another.

The measurement circuit 126 includes resistors R1 and R2, a control power supply VS, and a comparator 132. The load voltage V5 is divided by the resistors R1 and R2. Voltage applied to both ends of the resistors R2 is referred to as "output voltage". The potential at a connecting point F between the resistors R1 and R2 is input to the negative terminal of the comparator 132 as "measurement potential". A control power supply VS is connected to the positive terminal of the comparator 132. Input voltage at the positive terminal of the comparator 132 generated by the control power supply VS is referred to as "reference potential".

The comparator 132 amplifies a difference (hereinafter, referred to as "correction voltage") between the measurement potential and reference potential and outputs the amplified value as the T0 signal. The T0 signal is a DC voltage signal and indicates the magnitude of the correction voltage. In other words, the T0 signal is a signal indicating a change amount of the load voltage V5. Although the details will be described later, in the wireless power transmission system 100, the feeding power is controlled so as to make the correction voltage be a predetermined value to thereby stabilize the output voltage (load voltage V5). In the present embodiment, the resistors R1, R2, and reference potentials are set such that the correction voltage is 2.5 (V) when the load voltage V5 is 24 (V) which is a target value. The control power supply VS is a variable DC voltage supply and can arbitrarily be adjusted.

The signal generation circuit 122 converts the T0 signal as the DC voltage signal into the T4 signal as the AC voltage signal. The T4 signal is an "output signal" indicating the magnitude of the output voltage, which is amplified by the operational amplifier 110 and transmitted from the signal transmitting coil L6 to the signal receiving coil L5 as the T11 signal. By this T11 signal, the power feeding side can recognize the magnitude of the correction voltage. A circuit configuration and processing content of the signal generation circuit 122 will be described later using FIGS. 21, 22, and 23.

A configuration of the power transmission control circuit 200 will be described. A VCO (Voltage Controlled Oscillator) 202 is connected to the primary side of the gate-drive transformer T1. The VCO 202 functions as an "oscillator" that generates AC voltage VO at the drive frequency fo. Although the waveform of the AC voltage VO may be a sine wave, it is assumed here that the voltage waveform is a rectangular wave (digital wave). The AC voltage VO causes current to flow in a transformer T1 primary coil Lh alternately in both positive and negative directions. A transformer T1 primary coil Lh, a transformer T1 secondary coil Lf, and a transformer T1 secondary coil Lg constitute a gate-drive coupling transformer T1. Electromagnetic induction causes current to flow also in the transformer T1 secondary coil Lf and transformer T1 secondary coil Lg alternately in both positive and negative directions.

As the VCO 202 in the present embodiment, a built-in unit (product serial number MC14046B) manufactured by Motorola, Inc is used. The VCO 202 also has a function of dynamically changing the drive frequency fo based on phase difference indicating voltage SC fed from the phase comparison circuit 150 (described later in detail).

The following description will be made assuming that the minimum value fo1 of the drive frequency fo is 101 kHz, and the maximum value fo2 thereof is 110 kHz. The appropriate range of the phase difference indicating voltage SC is 1.0 (V) to 4.0 (V). The phase difference indicating voltage SC and drive frequency fo are directly proportional to each other. That is, when the phase difference indicating voltage SC is 1.0 (V), the drive frequency fo (=fo1) is 101 kHz, and when the phase difference indicating voltage SC is 4.0 (V), the drive frequency fo (=fo2) is 110 kHz.

Capacitors CA and CB charged by a DC power supply VDD each serve as a power supply for the power transmission control circuit 200. The capacitor CA is provided between points C and E of FIG. 16, and capacitor CB is provided between points E and D. Assuming that the voltage (voltage between points C and E) of the capacitor CA is VA, voltage (voltage between points E and D) of the capacitor CB is VB, VA+VB (voltage between points C and D) represents input voltage. That is, the capacitors CA and CB each function as a DC voltage supply.

One end of the transformer T1 secondary coil Lf is connected to the gate of a switching transistor Q1, and the other end of the transformer T1 secondary coil Lf is connected to the source of a switching transistor Q1. One end of the transformer T1 secondary coil Lg is connected to the gate of a switching transistor Q2, and the other end of the transformer T1 secondary coil Lg is connected to the source of a switching transistor Q2. When VCO 202 generates AC voltage VO at drive frequency fo, voltage Vx (Vx>0) is alternately applied, at drive frequency fo, to the gates of the switching transistors Q1 and Q2. As a result, the switching transistors Q1 and Q2 are alternately turned on/off at the drive frequency fo. The switching transistors Q1 and Q2 are enhancement type MOSFET (Metal Oxide Semiconductor Field effect transistor) having the same characteristics but may be other transistors such as a bipolar transistor. Further, other switches such as a relay switch may be used in place of the transistor.

The drain of the switching transistor Q1 is connected to the positive electrode of the capacitor CA. The negative electrode of the capacitor CA is connected to the source of the switching transistor Q1 through the transformer T2 primary coil Lb. The source of the switching transistor Q2 is connected to the negative electrode of the capacitor CB. The positive electrode of the capacitor CB is connected to the drain of the switching transistor Q2 through the transformer T2 primary coil Lb.

Voltage between the source and drain of the switching transistor Q1 is referred to as source-drain voltage VDS1, and voltage between the source and drain of the switching transistor Q2 is referred to as source-drain voltage VDS2. Current flowing between the source and drain of the switching transistor Q1 is referred to as source-drain current IDS1, and current flowing between the source and drain of the switching transistor Q2 is referred to as source-drain current IDS2. The directions of arrows in the diagram indicate the positive directions, and directions opposite to the directions of the arrows indicate the negative directions.

When the switching transistor Q1 is turned conductive (ON), the switching transistor Q2 is turned non-conductive (OFF). A main current path (hereinafter, referred to as "first current path") at this time extends from the positive electrode of the capacitor CA, passes through the point C, switching transistor Q1, transformer T2 primary coil Lb, and point E in this order, and returns to the negative electrode of the capacitor CA. The switching transistor Q1 functions as a switch for controlling conduction/non-conduction of the first current path.

When the switching transistor Q2 is turned conductive (ON), the switching transistor Q1 is turned non-conductive (OFF). A main current path (hereinafter, referred to as "second current path") at this time extends from the positive electrode of the capacitor CB, passes through the point E, transformer T2 primary coil Lb, switching transistor Q2, and point D in this order, and returns to the negative electrode of the capacitor CB. The switching transistor Q2 functions as a switch for controlling conduction/non-conduction of the second current path.

Current flowing in the transformer T2 primary coil Lb in the power transmission control circuit 200 is referred to as "current IS". The current IS is AC current, and the current flow in a first current path is defined as the positive direction and current flow in a second current path is defined as the negative direction.

When the VCO 202 supplies the AC voltage VO at the drive frequency fo, the first and second current paths are switched at the drive frequency fo. Since the AC current IS of the drive frequency fo flows in the transformer T2 primary coil Lb, the AC current I2 flows in the feeding coil circuit 120 at the drive frequency fo. The closer the drive frequency fo is to the resonance frequency fr, the higher the power transmission efficiency becomes. When the drive frequency fo coincides with the resonance frequency fr1, the power feeding coil L2 of the feeding coil circuit 120 and capacitor C2 are in a resonance state. The receiving coil circuit 130 is also a resonance circuit of the resonance frequency fr1, so that the power feeding coil L2 and power receiving coil L3 magnetically resonate. At this time, the maximum transmission efficiency is obtained.

In the case of the third embodiment, however, the resonance frequency fr1 is not included in the operating range of the drive frequency fo, so that the power transmission efficiency does not reach the maximum value. This is because priority is given to the stability of the load voltage V5 over the maximization of the power transmission efficiency. A change in the load voltage V5 can be detected from the correction voltage, so that the wireless power feeder 116 automatically adjusts the drive frequency fo so as to make the correction voltage be zero. The details will be described later.

The resonance frequency fr1 slightly changes depending on use condition or use environment of the feeding coil circuit 120 or receiving coil circuit 130. Further, in the case where the feeding coil circuit 120 or receiving coil circuit 130 is replaced with new one, the resonance frequency fr1 changes. Alternatively, there may be case where the resonance frequency fr1 needs to be changed aggressively by setting the electrostatic capacitance of the capacitor C2 or capacitor C3 variable. Further, according to the experiment made by the present inventor, it has been found that the resonance frequency fr1 starts falling when the distance between the power feeding coil L2 and power receiving coil L3 is made smaller to some extent. When the difference between the resonance frequency fr1 and drive frequency fo changes, the power transmission efficiency changes. When the power transmission efficiency changes, the load voltage V5 also changes. Therefore, in order to stabilize the load voltage V5, it is necessary to keep the difference between the resonance frequency fr1 and the drive frequency fo constant even if the resonance frequency fr1 changes.

A detection coil LSS is provided at the feeding coil circuit 120. The detection coil LSS is a coil wounded around a core 154 (toroidal core) having a penetration hole NS times. The core 154 is formed of a known material such as ferrite, silicon steel, or permalloy. The number of windings NS of the detection coil LSS in the present embodiment is 100.

A part of the current path of the feeding coil circuit 120 penetrates the penetration hole of the core 154. This means that the number of windings NP of the feeding coil circuit 120 with respect to the core 154 is one. With the above configuration, the detection coil LSS and power feeding coil L2 constitute a coupling transformer. An AC magnetic field generated by the AC current I2 of the power feeding coil L2 causes inductive current ISS having the same phase as that of the current I2 to flow in the detection coil LSS. The magnitude of the inductive current ISS is represented by I2·(NP/NS) according to the law of equal ampere-turn.

A resistor R4 is connected to both ends of the detection coil LSS. One end B of the resistor R4 is grounded, and the other end A thereof is connected to a phase comparison circuit 150 through an operational amplifier 142 and the like.

Potential VSS is digitized by the operational amplifier 142 and diode D2 to be an S1 signal. The operational amplifier 142 outputs a saturated voltage of 3.0 (V) when the potential VSS exceeds a first threshold value, e.g., 0.1 (V) and outputs a saturated voltage of −3.0 (V) when the potential VSS falls below a second threshold value, e.g., −0.1 (V). A negative component is cut by the diode D2 and thereby the potential VSS is converted into the S1 signal of a digital waveform. The current I2 and inductive current ISS have the same phase, and the inductive current ISS and potential VSS have the same phase. Further, the AC current IS flowing in the power transmission control circuit 200 and current I2 have the same phase. Therefore, by observing the waveform of the S1 signal, the current phase of the AC current IS can be measured.

When the resonance frequency fr1 and drive frequency fo coincide with each other, the current phase and voltage phase coincide with each other. A deviation between the resonance frequency fr1 and drive frequency fo can be measured from a phase difference between the current phase and voltage phase. The wireless power transmission system 100 according to the present embodiment measures the deviation between the resonance frequency fr1 and drive frequency fo based on the phase difference to thereby make the drive frequency fo automatically track a change of the resonance frequency fr1.

The phase detection circuit 114 includes a voltage shaping circuit 144, a phase comparison circuit 150, and a low-pass filter 152. The low-pass filter 152 is a known circuit and inserted so as to cut a high-frequency component of the phase difference indicating voltage SC. As the phase comparison circuit 150 in the present embodiment, a built-in unit (Phase Comparator) (product serial number MC14046B) manufactured by Motorola is used, as in the case of the VCO 202. Thus, the phase comparison circuit 150 and VCO 202 can be implemented in one chip.

The S1 signal indicating a current phase is input to the phase comparison circuit 150. The AC voltage VO generated by the VCO 202 is input to the phase comparison circuit 150 as an T8 signal indicating a voltage phase after the voltage waveform thereof is shaped by the voltage shaping circuit 144 (to be described later). The phase comparison circuit 150 detects a deviation (phase difference) between the current phase and voltage phase from the S1 and T8 signals and generates the phase difference indicating voltage SC indicating the magnitude of the phase difference. Detecting the phase difference allows detection of the magnitude of the deviation between the resonance frequency fr1 and drive frequency fo. It is possible to keep the phase difference between the drive frequency fo and resonance frequency fr1 constant by controlling the drive frequency fo according to the phase difference indicating voltage SC.

For example, when the drive frequency fo and resonance frequency fr1 deviate from each other, the phase difference is accordingly increased, so that the phase comparison circuit 150 generates the phase difference indicating voltage SC so as to reduce the phase difference. Thus, even if the resonance frequency fr1 changes, it is possible to keep the power transmission efficiency constant to thereby stabilize the load voltage V5. A circuit configuration of the voltage shaping circuit 144 and the signal adjustment circuit 112 will be described later using FIG. 25, and relationship between the S1 and T8 signals will be described later using FIG. 29.

The S2 signal may be obtained by connecting resistors to both ends of the transformer T1 primary coil Lh in parallel to divide the AC voltage VO. Even in the case where the AC voltage VO generated by the VCO 202 is large, the AC voltage can be reduced to a manageable level by the voltage division. The voltage phase may be measured from the source-drain voltages VDS1 and VDS2 or source-gate voltages VGS1 and VGS2.

Even though the resonance frequency fr1 is constant, the load voltage V5 may be changed in some cases. For example, in the case where the load LD is a variable resistor or in the case where the load LD is replaced with new one, the load voltage V5 changes. In the first embodiment, a change in the load voltage V5 is detected as the correction voltage, and the drive frequency fo is automatically adjusted so as to make the correction voltage be zero, whereby the load voltage V5 is stabilized.

The magnitude of the correction voltage is transmitted from the signal transmitting coil L6 to a signal receiving coil L5 as a T11 signal (AC magnetic field signal). The signal receiving coil L5 detects the T11 signal which is an AC magnetic field signal as an AC voltage signal T5 and supplies the signal T5 to the signal adjustment circuit 112. The signal adjustment circuit 112 converts the AC voltage signal T5 into a DC voltage signal T6. The signal level of the T6 signal has a positive correlation with the load voltage V5. The conversion process from the T5 signal into T6 signal will be described in detail later with reference to FIG. 27.

A T7 signal (voltage phase) which is an output of the voltage shaping circuit 144 is input to the positive terminal of the comparator 128, and T6 signal (signal indicating correction voltage) which is an output of the signal adjustment circuit 112 is input to the negative terminal of the comparator 128. The comparator 128 adjusts the phase of the T7 signal using the T6 signal and outputs a T8 signal (AC voltage signal) as a correction voltage phase.

When the load voltage V5 is 24 (V), which is a desired value, that is, when the correction voltage is 2.5 (V), the T6 signal assumes a desired value (hereinafter, referred to as "balanced value"). The phase of the T8 signal is corrected by the balanced value and delays with respect to the phase of the T7 signal. The phase comparison circuit 150 detects a phase difference between the current phase and voltage phase of the AC power based on the S1 and T8 (=T7 signal) signals and outputs the phase difference indicating voltage SC. The VCO 202 adjusts the drive frequency fo based on the phase difference indicating voltage SC. More specifically, the VCO 202 changes the pulse width of the AC voltage VO to thereby change the drive frequency fo.

Also when the correction voltage is not 2.5 (V), the phase comparison circuit 150 detects the phase difference between the voltage phase and current phase of the AC power based on the S1 and T8 signals and outputs the phase difference indicating voltage SC. When the correction voltage is higher than 2.5 (V), the phase of the T8 signal further delays. On the other hand, when the correction voltage is lower than 2.5 (V), the phase of the T8 signal advances. At any rate, since the T8 signal is a signal obtained by adjusting the phase of the T7 signal based on the T6 signal, it does not indicate the actual voltage phase. The adjustment logic based on the correction voltage will be described later using FIG. 29.

Figure 17:
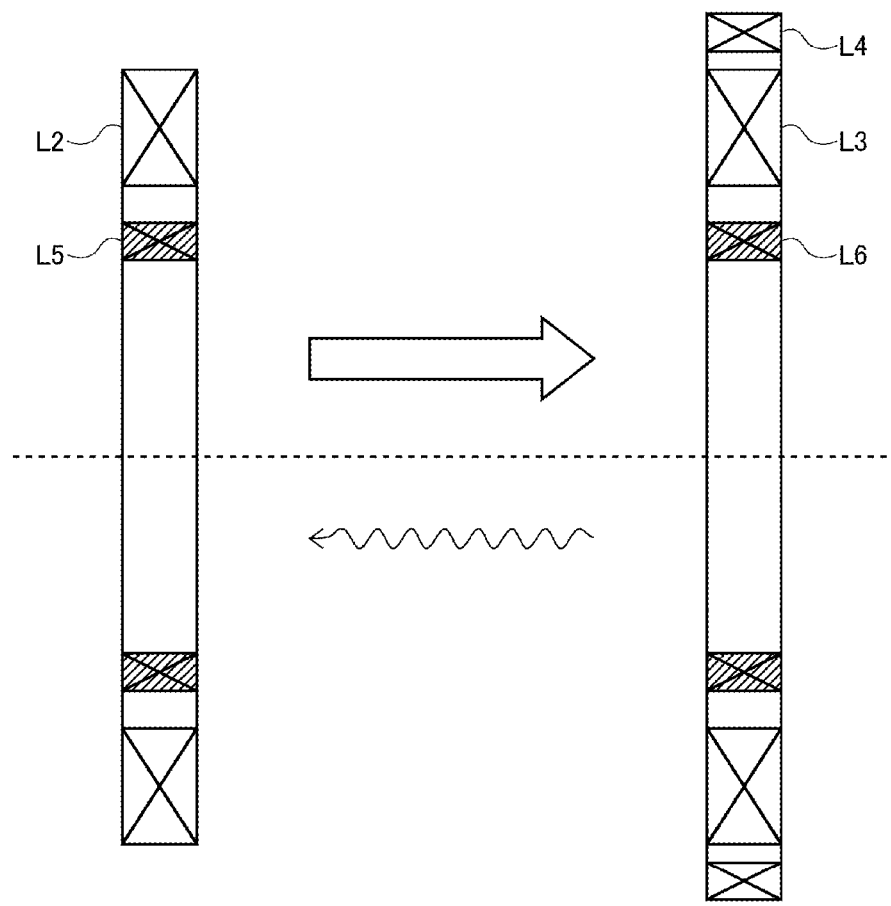
FIG. 17 is a view illustrating structures of the coils in the third embodiment.

FIG. 17 is a view illustrating structures of the coils. On the power feeding side, the signal receiving coil L5 is actually provided inside the power feeding coil L2. In other words, the coil plane of the power feeding coil L2 and that of the signal receiving coil L5 coincide with each other. The power feeding coil L2 is a coil for feeding power to the power receiving coil L3, and the signal receiving coil L5 is a coil for receiving the T11 signal from the signal transmitting coil L6. The number of windings of the signal receiving coil L5 is 1, diameter of a conductive wire thereof is 5 mm, and shape of the signal receiving coil L5 itself is a square of 260 mm×260 mm.

On the power receiving side, the signal transmitting coil L6 is provided inside the power receiving coil L3. Further, the loading coil L4 is provided outside the power receiving coil L3. In other words, the coil plane of the power receiving coil L3, that of the loading coil L4, and that of the signal transmitting coil L6 coincide with each other. The power receiving coil L3 is a coil for receiving power, and the signal transmitting coil L6 is a coil for transmitting the T11 signal. The number of windings of the signal transmitting coil L6 is 1, diameter of a conductive wire thereof is 5 mm, and shape of the signal transmitting coil L6 itself is a square of 260 mm×260 mm.

As described above, in the present embodiment, the central axes of the power feeding coil L2, signal receiving coil L5, loading coil L4, power receiving coil L3, and signal transmitting coil L6 coincide with each other. The signal receiving coil L5 has a simple shape and thus can be formed integrally with the power feeding coil L2 in a compact manner. Similarly, the signal transmitting coil L6 has a simple shape and thus can be formed integrally with the power receiving coil L3 or loading coil L4 in a compact manner.

Figure 18:
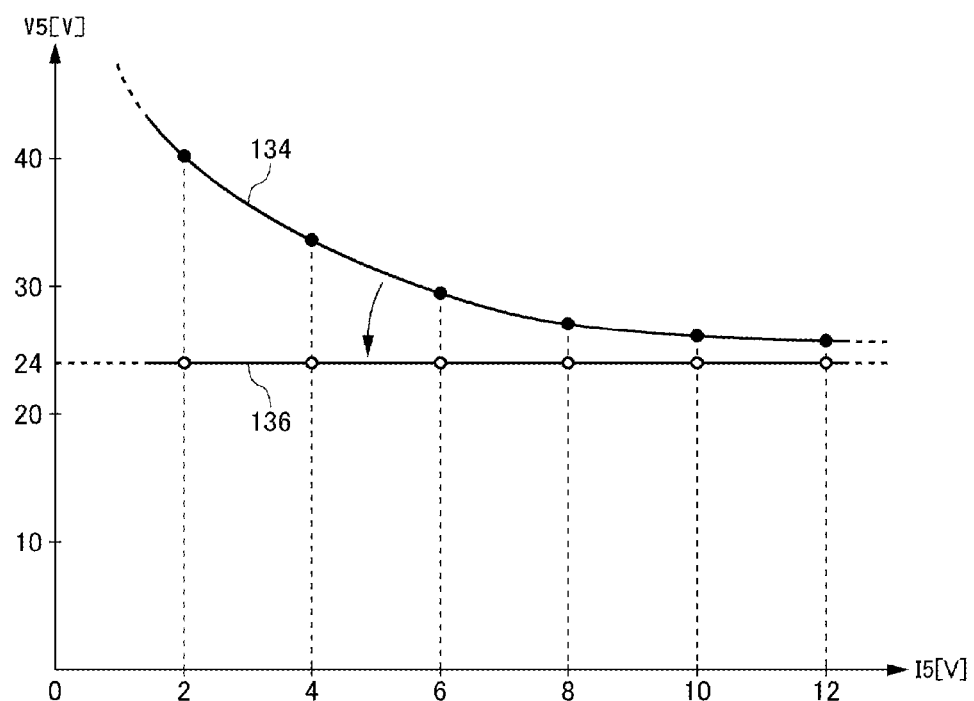
FIG. 18 is a graph illustrating a relationship between load current and load voltage in the third embodiment.

FIG. 18 is a graph illustrating a relationship between load current I5 and load voltage V5. The horizontal axis represents the magnitude of the load current I5 (DC) flowing in the load LD, and the vertical axis represents the load voltage V5. A non-adjustment characteristic 134 represents a current-voltage characteristic obtained in the case where adjustment based on the correction voltage is not performed. In the case of the non-adjustment characteristic 134, when the load LD increases, the load current I5 decreases while the load voltage V5 increases. On the other hand, when the load LD decreases, the load current I5 increases while the load voltage V5 decreases. As described above, when the load LD changes, the load voltage V5 changes even when constant power is fed.

In the case of the non-adjustment characteristic 134, when the load current I5 is 0 (A), the load voltage V5 may increase up to about 60 (V) and, in some cases, may exceed the rated value of the load LD.

The wireless power transmission system 100 in the present embodiment achieves the current-voltage characteristic represented by an adjustment characteristic 136. To be specific, the S1 signal is adjusted based on the correction voltage to change the power transmission efficiency, whereby the load voltage V5 is stabilized.

Figure 19:
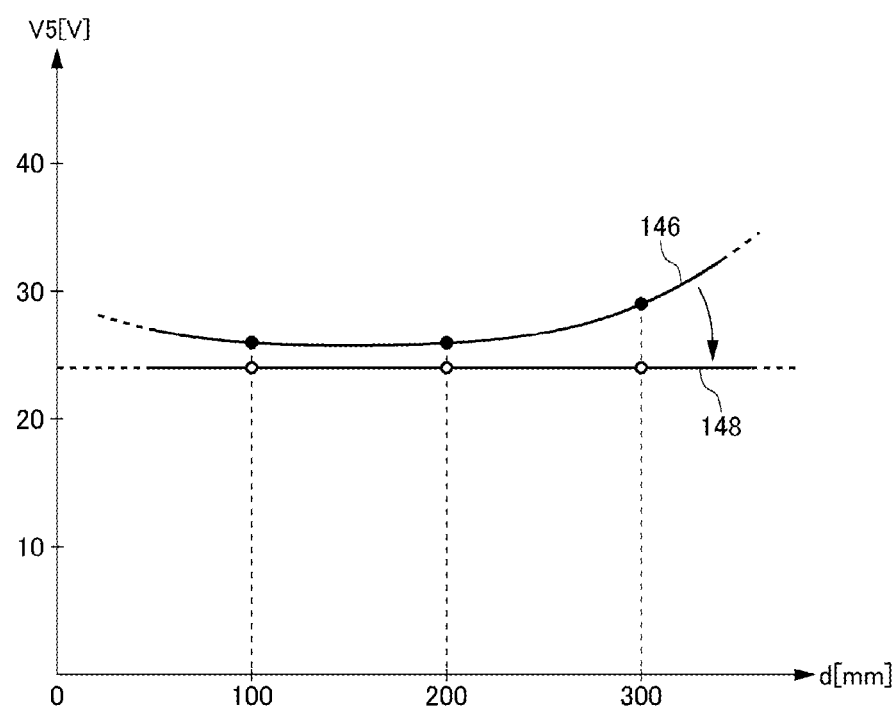
FIG. 19 is a graph illustrating an inter-coil distance and load voltage in the third embodiment.

FIG. 19 is a graph illustrating a relationship between inter-coil distance d and load voltage V5. The horizontal axis represents the inter-coil distance d between the power feeding coil L2 and power receiving coil L3, and the vertical axis represents the load voltage V5. A non-adjustment characteristic 146 represents a voltage-distance characteristic obtained in the case where adjustment based on the correction voltage is not performed. As describe above, the resonance frequency fr1 changes depending on the inter-coil distance d. When the resonance frequency fr1 changes to cause the difference between the drive frequency fo and resonance frequency fr1 to change, the power transmission efficiency changes. Even when the drive frequency fo is made to track the resonance frequency fr1, the load voltage V5 changes to a certain degree depending on the inter-coil distance d.

The wireless power transmission system 100 in the present embodiment achieves the voltage-distance characteristic represented by an adjustment characteristic 148. That is, the T8 signal is adjusted based on the correction voltage to change the power transmission efficiency, whereby the load voltage V5 is stabilized.

Figure 20:
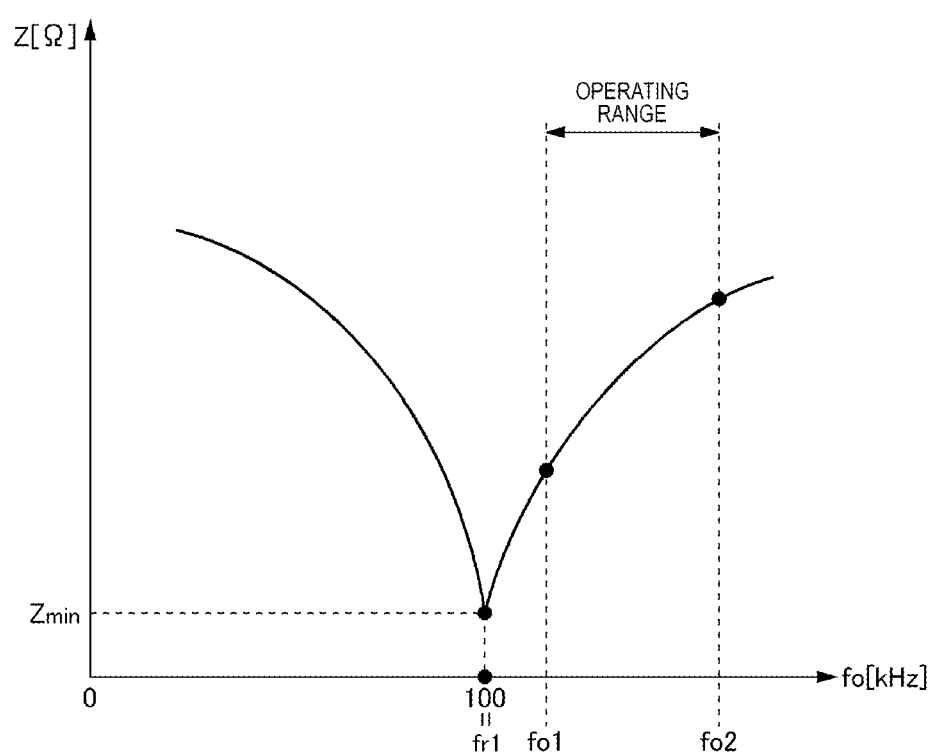
FIG. 20 is a graph illustrating a relationship between the impedance of a feeding coil circuit and drive frequency in the third embodiment.

FIG. 20 is a graph illustrating a relationship between the impedance Z of the power feeding coil circuit 120 and drive frequency fo. The vertical axis represents the impedance Z of the feeding coil circuit 120 (a circuit in which the capacitor C2 and the power feeding coil L2 are connected in series). The horizontal axis represents the drive frequency fo. The impedance Z is a minimum value Zmin at the resonance state. Although Zmin=0 at the resonance state is ideal, Zmin does not become zero in general since some resistance components are included in the feeding coil circuit 120.

When the drive frequency fo and resonance frequency fr1 coincide with each other, the impedance Z becomes minimum and the capacitor C2 and power feeding coil L2 are put in a resonance state. When the drive frequency fo becomes lower than the resonance frequency fr1, capacitive reactance prevails, so that the impedance Z increases and, accordingly, the current phase advances with respect to the voltage phase. On the other hand, when the drive frequency fo becomes higher than the resonance frequency fr1, inductive reactance prevails, so that the impedance Z increases and, accordingly, the current phase delays with respect to the voltage phase.

The impedance Z increases as the deviation from the drive frequency fo and resonance frequency fr1 advances, with the result that the power transmission efficiency is degraded. That is, it is possible to change the power transmission efficiency by changing the difference between the drive frequency fo and resonance frequency fr1.

Figure 21:
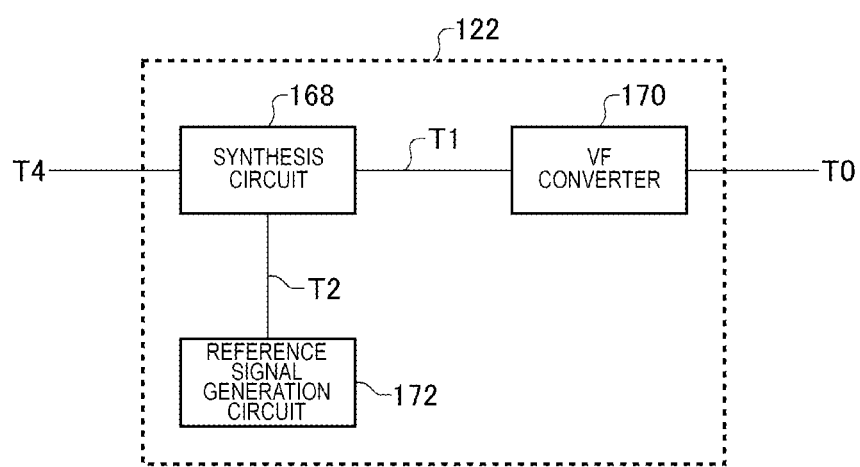
FIG. 21 is a circuit diagram of a signal generation circuit.
Figure 22:
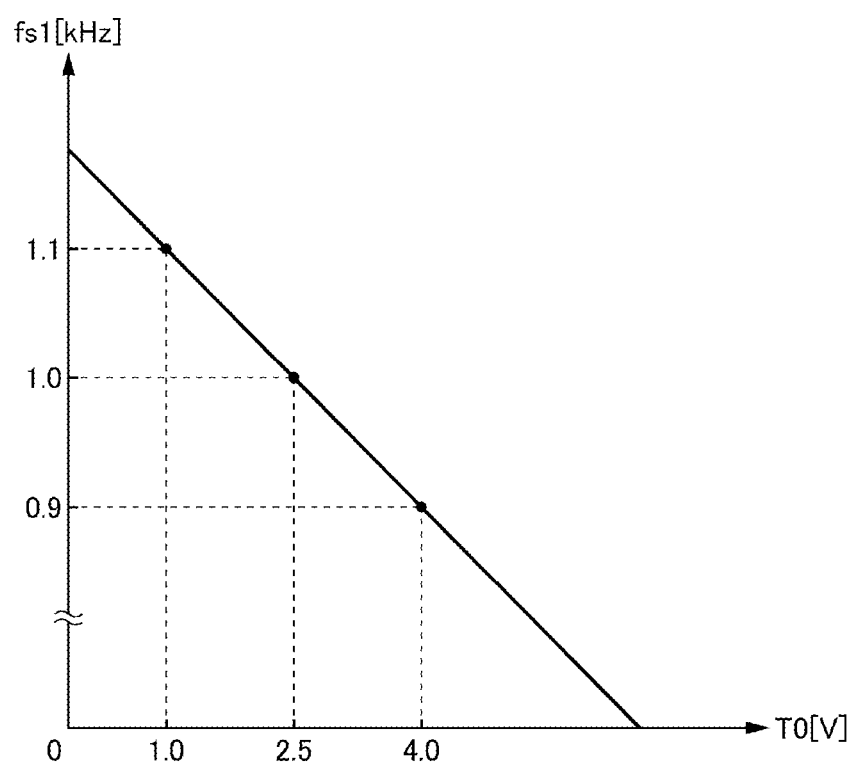
FIG. 22 is a graph illustrating a relationship between the signal frequency and T0 signal in a VF converter.

FIG. 21 is a circuit diagram of the signal generation circuit 122. The signal generation circuit 122 includes a synthesis circuit 168, a VF converter 170, and a reference signal generation circuit 172. The measurement circuit 126 supplies the T0 signal (DC voltage signal) indicating the correction voltage to the VF converter 170. The VF converter 170 generates the T1 signal (AC voltage signal) which is a pulse signal of a duty ratio of 50%. The signal frequency fs1 of the T1 signal changes in accordance with the T0 signal (correction voltage) within a range of 0.9 kHz to 1.1 kHz. FIG. 22 is a graph illustrating a relationship between the signal frequency fs1 and T0 signal in the VF converter 170.

The reference signal generation circuit 172 generates the AC voltage signal T2 at a reference frequency fs2. The reference frequency fs2 in the present embodiment is 10 MHz, which is considerably higher than the resonance frequency fr1 and signal frequency fs1. The synthesis circuit 168 generates the AC voltage signal T4 based on the T2 signal at the reference frequency fs2 and T1 signal at the signal frequency fs1. The T4 signal is an "output signal" indicating the magnitude of the output on the power receiving side. The T4 signal is amplified by the operational amplifier 110 and transmitted from the signal transmitting coil L6 to the wireless power feeder 116. By this T4 signal, the power feeding side can recognize the magnitude of the correction voltage, that is, a change amount of the load voltage V5.

Figure 23:
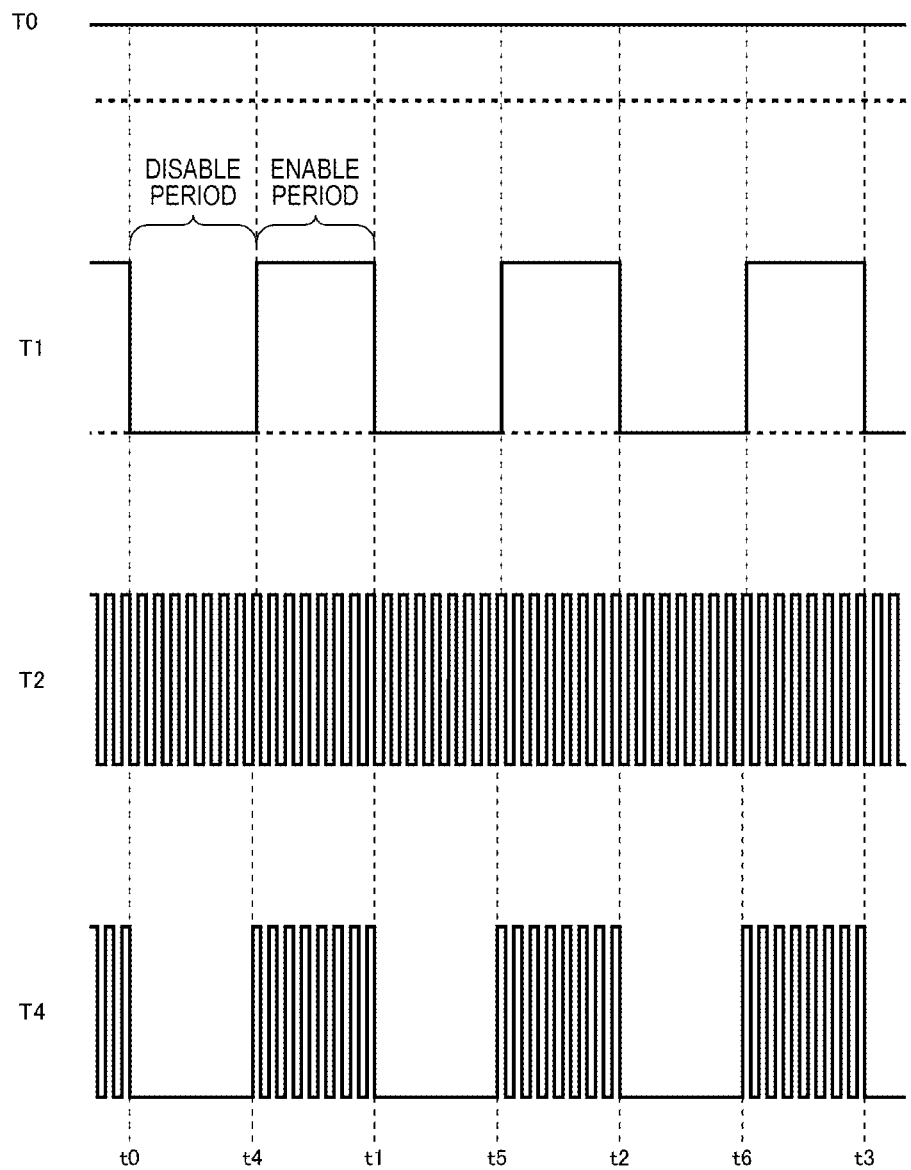
FIG. 23 is a time chart illustrating a relationship among T1, T2, and T3 signals.

FIG. 23 is a time chart illustrating a relationship between the T1, T2, and T4 signals. The T1 signal is a pulse signal having a duty ratio of 50% and signal frequency fs1 in which each of the time periods from t0 to t1, t1 to t2, . . . , is set as the unit period. The signal frequency fs1 is variable in accordance with the signal level of the T0 signal. In other words, the length of the unit period changes based on the signal level of the T0 signal. The time period during which the T1 signal assumes a high level is referred to as "enable period", and time period during which the T1 signal assumes a low level is referred to as "disable period". The T2 signal is a high-frequency AC voltage signal having a duty ratio of 50% and a reference frequency fs2 of 10 MHz. It is assumed here that the T2 signal has a rectangular waveform (digital waveform) although it may have a sine waveform. The synthesis circuit 168 passes the T2 signal therethrough as the T4 signal only during the enable period. That is, the logical AND between the T1 and T2 signals corresponds to the T4 signal. Thus, the T4 signal serves as the AC voltage signal including a signal frequency fs1 component and a reference frequency fs2 component.

The T4 signal is amplified by the operational amplifier 110 and then transmitted from the signal transmitting coil L6 to the signal receiving coil L5 as the T11 signal. The duty ratio between the enable period and disable period does not change, while the length of the unit period changes depending on the correction voltage. The lower the correction voltage (the higher the load voltage V5), the higher the signal frequency fs1 (refer to FIG. 21).

Figure 24:
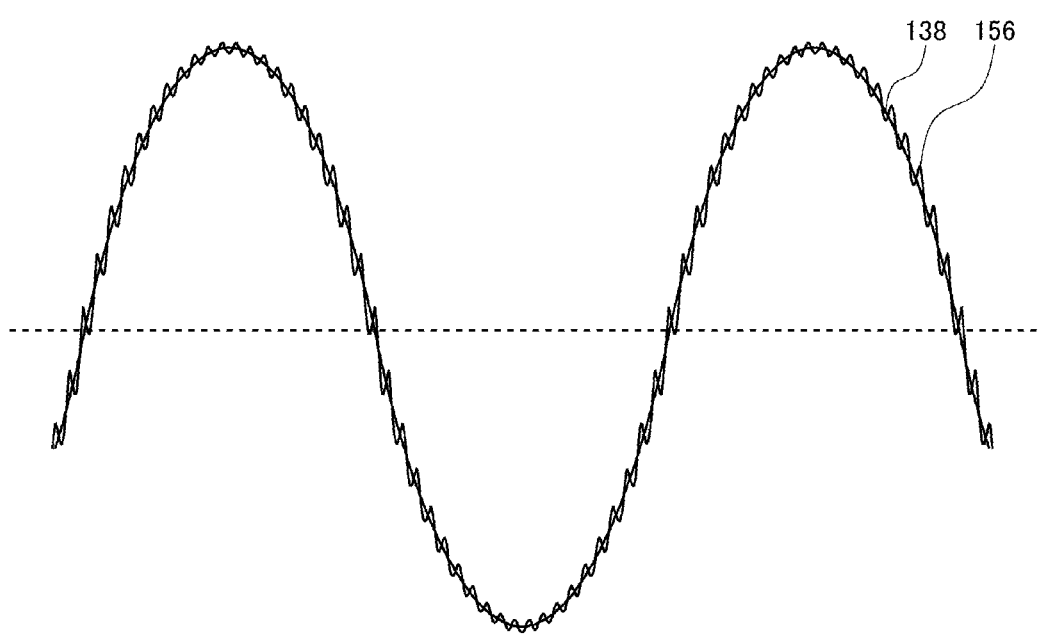
FIG. 24 is a view schematically illustrating a waveform of an electromagnetic field generated between power feeding and power receiving coils.

FIG. 24 is a view schematically illustrating a waveform of an electromagnetic field generated between the power feeding coil L2 and power receiving coil L3. A power waveform 138 represents the waveform of an AC power fed from the power feeding coil L2 to the power receiving coil L3. The frequency of the power waveform 138 is about the resonance frequency fr1 (=100 kHz). A signal frequency 156 represents the waveform of the T11 signal transmitted from the signal transmitting coil L6 to signal receiving coil L5. The signal waveform 156 includes the signal frequency fs1 (=about 1.0 kHz) and reference frequency fs2 (=10 MHz). However, the T11 signal includes a signal component of the reference frequency fs2 only during the enable period.

As described above, an electromagnetic field in which the power waveform 138 and signal waveform 156 have been superimposed on each other is generated between the power feeding coil L2 and power receiving coil L3. Thus, it is necessary to extract only the output signal (T11 signal) from the voltage signal received by the signal receiving coil L5.

Figure 25:
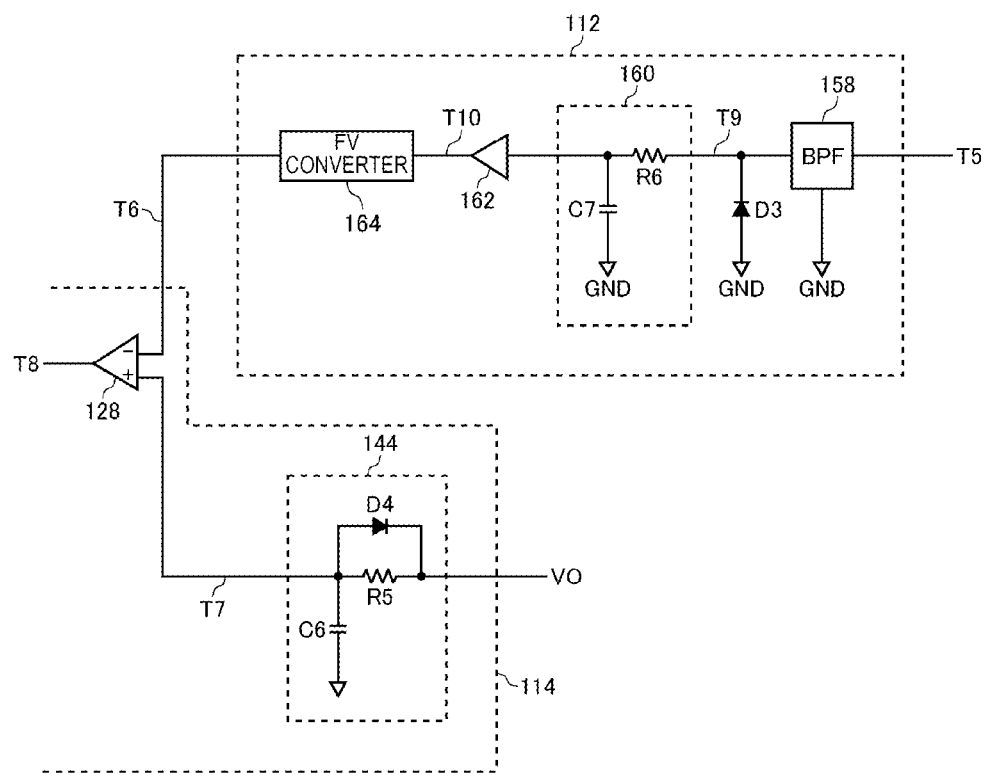
FIG. 25 is a circuit diagram of the voltage shaping circuit and signal adjustment circuit.

FIG. 25 is a circuit diagram of the voltage shaping circuit 144 and signal adjustment circuit 112. The AC voltage VO is shaped into the T7 signal of a saw-tooth waveform by the voltage shaping circuit 144. In the voltage shaping circuit 144, a resistor R5 is inserted in the path of the T7 signal, and a diode D4 is connected in parallel to the resistor R5. The path of the T7 signal is grounded through a capacitor C6. The T7 signal is input to the positive terminal of the comparator 128. The T7 signal is a signal indicating the original voltage phase.

From the T5 signal in which the power waveform 138 and signal waveform 156 have been superimposed on each other, only the reference frequency fs component is extracted by a band-pass filter 158. The negative component of the extracted component is cut by a diode D3 to obtain a T9 signal. The band-pass filter 158 is a ceramic filter that utilizes mechanical resonance.

Figure 26:
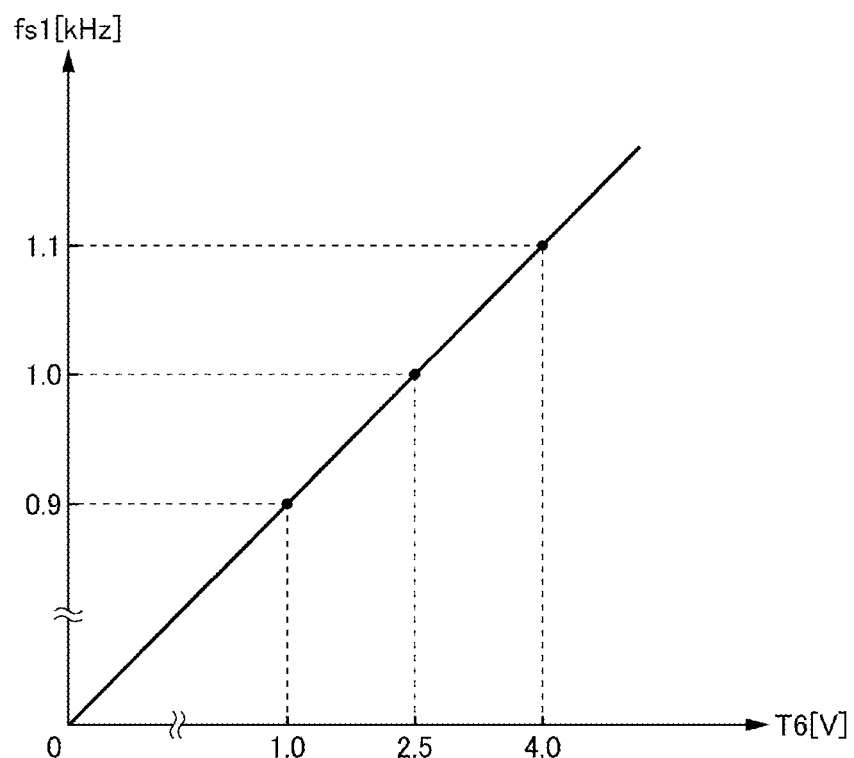
FIG. 26 is a graph illustrating a relationship between the signal frequency and T6 signal in an FV converter.

The T9 signal is smoothed by the smoothing circuit 160 including the resistor R6 and capacitor C7 and then amplified by the operation amplifier 162 to become the T10 signal. The T10 signal is a pulse-like voltage signal having a duty ratio of 50% and changing at the signal frequency fs1. The T10 signal is converted into a DC voltage signal T6 by an FV converter 164. FIG. 26 is a graph illustrating a relationship between the signal frequency fs1 and T6 signal in the FV converter 164. The higher the signal frequency fs1, the higher the voltage level of the T6 signal is set.

Figure 27:
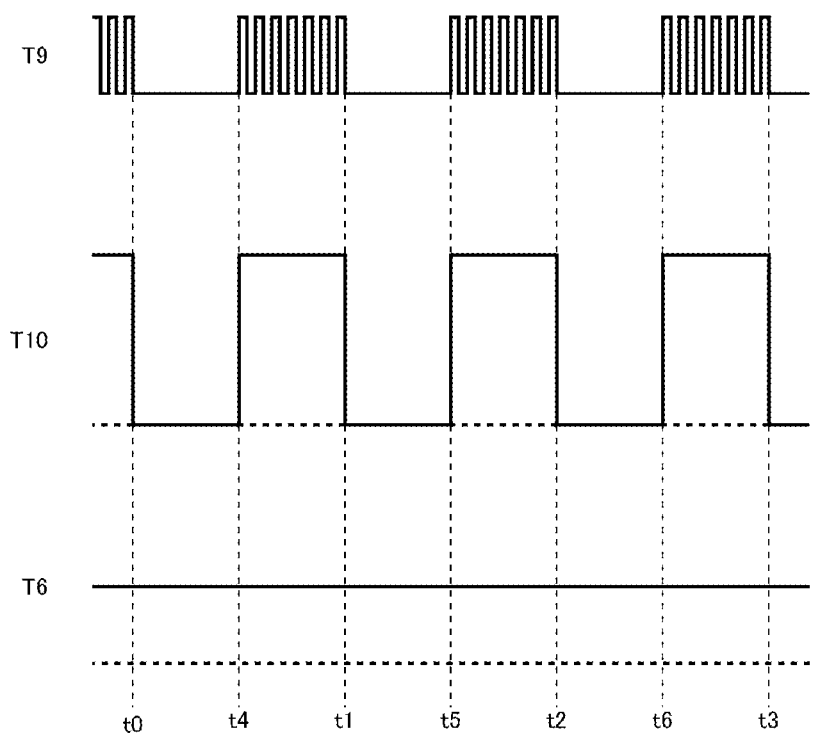
FIG. 27 is a time chart illustrating a relationship among T9, T10, and T6 signals.

FIG. 27 is a time chart illustrating a relationship between the T9, T10, and T6 signals. The T9 signal is a signal obtained by extracting the reference frequency fs2 component from the T5 signal and cutting the negative component of the extracted component. The T9 signal has a signal waveform that reproduces the T4 signal. However, the amplitude of the T9 signal is smaller than that of the T4 signal due to transmission loss.

The smoothing circuit 160 smoothes the T9 signal to generate the T10 signal. The T10 signal is a signal that reproduces the T1 signal. Further, the FV converter 164 generates the DC voltage T6 signal in accordance with the signal frequency fs1 of the T10 signal. The higher the signal frequency fs1 of the T10 signal, the higher the signal level of the T6 signal becomes (refer to FIG. 26).

When taken together, the higher the load voltage V5, the higher the correction voltage becomes, which increases the voltage level input to the negative terminal of the comparator 132. As a result, the signal level of the T0 signal (DC voltage signal) becomes low. When the signal level of the T0 signal becomes low, the signal frequency fs1 of the T1 signal increases. As a result, the signal frequency fs1 of the T10 signal increases and accordingly the signal level of the T6 signal (DC voltage signal) increases.

Figure 28:
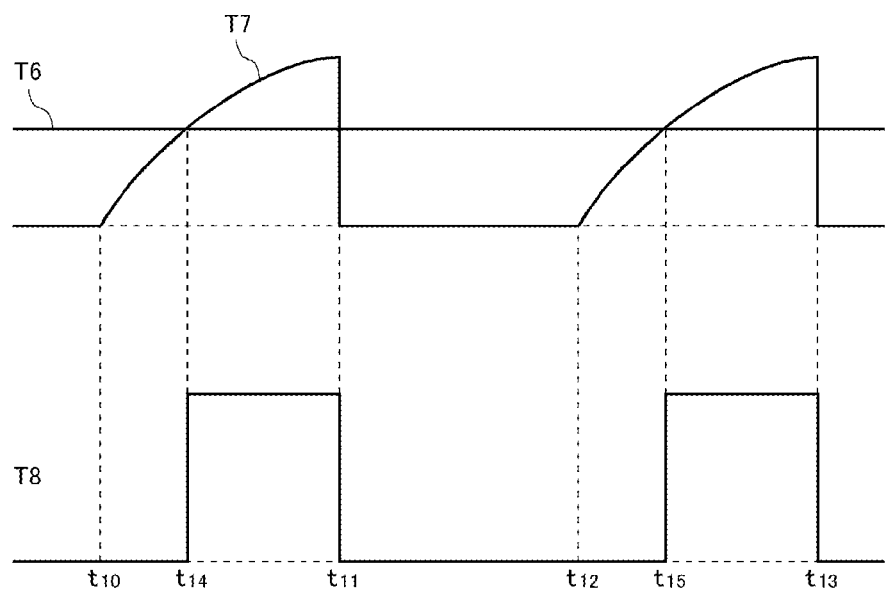
FIG. 28 is a time chart illustrating a relationship among T6, T7, and T8 signals.

FIG. 28 is a time chart illustrating a relationship among the T6, T7, and T8 signals. The VO signal, which is a digital signal, is shaped into the T7 signal of a saw-tooth waveform by the voltage shaping circuit 144. The T7 signal is an AC voltage signal of the drive frequency fo and indicates a voltage phase. The level of the T7 signal starts increasing at time t10 and abruptly decreases at time t11. The time period from time t10 to time t11 corresponds to the unit period of the T7 signal (VO signal). Since the drive frequency fo is 101 to 109 kHz, the time length of the unit period is about 0.01 (msec).

The T6 signal is a DC voltage signal whose voltage level changes depending on the correction voltage. The comparator 128 compares the T6 signal and T7 signal and generates the high-level T8 signal when the level of the T7 signal is higher than that of the T6 signal (T7>T6) while the comparator 128 generates the low-level T8 signal when the level of the T7 signal is not higher than that of the T6 signal (T7≤T6). Among the unit period from t10 to t11, the T8 signal assumes a low level from time t10 to t14 and assumes a high level from time t14 to t11. The level of the T6 signal changes based on the correction voltage, causing the duty ratio of the T8 signal to change. As described above, when the load voltage V5 increases, the signal level of the T6 signal increases. As a result, the duty ratio of the T8 signal decreases, and the rising time of the T8 signal delays.

Figure 29:
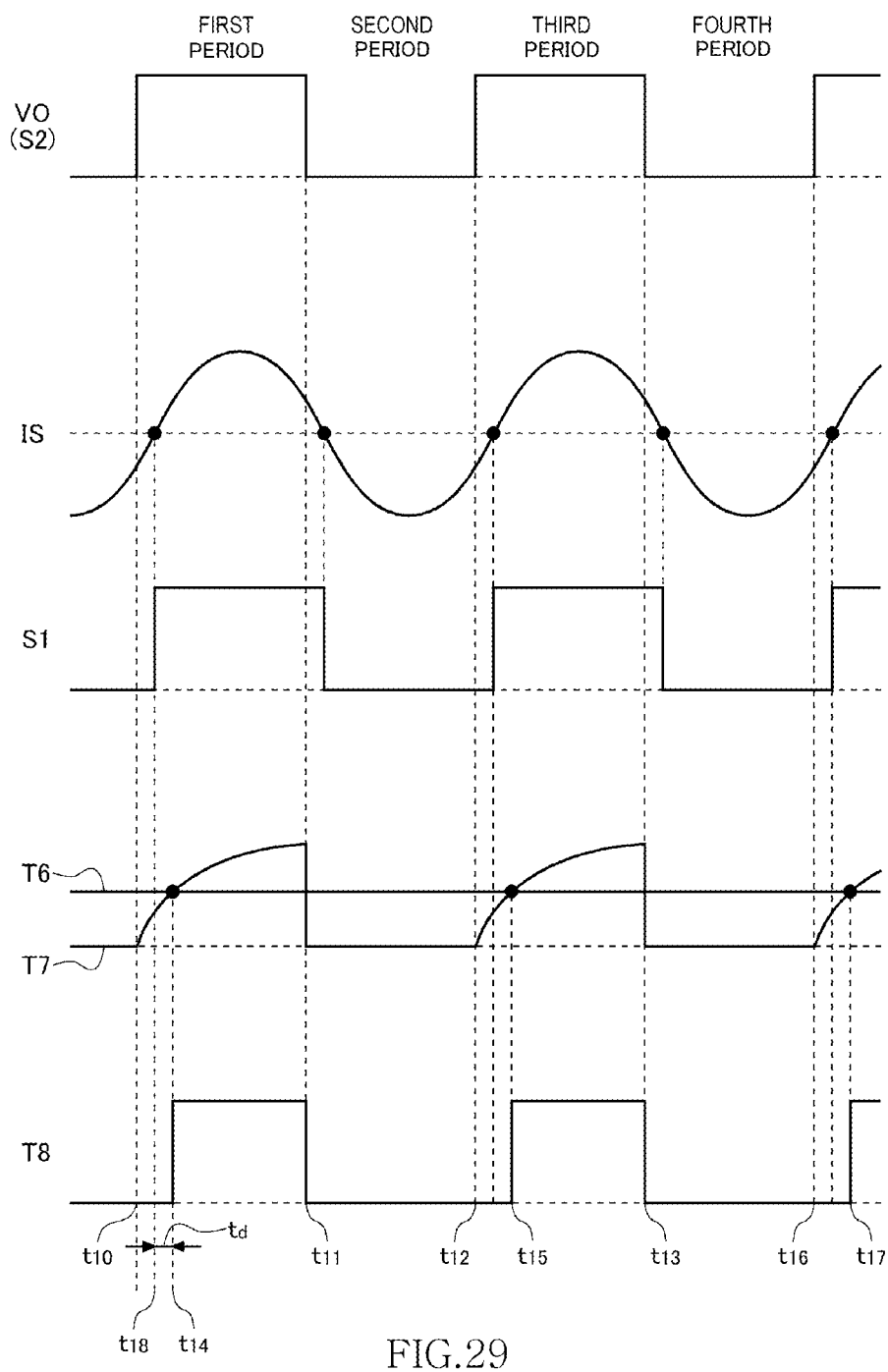
FIG. 29 is a time chart illustrating a relationship between the S1 signal and T8 signal.

FIG. 29 is a time chart illustrating a relationship between the S1 signal and T8 signal. Time period from time t10 to time t11 (hereinafter, referred to as "first period") is a time period during which the switching transistor Q1 is ON while the switching transistor Q2 is OFF. Time period from time t11 to time t12 (hereinafter, referred to as "second period") is a time period during which the switching transistor Q1 is OFF while the switching transistor Q2 is ON. Time period from time t12 to time t13 (hereinafter, referred to as "third period") is a time period during which the switching transistor Q1 is ON while the switching transistor Q2 is OFF. Time period from time t13 to time t14 (hereinafter, referred to as "fourth period") is a time period during which the switching transistor Q1 is OFF while the switching transistor Q2 is ON.

At time t10, the AC voltage VO (S2 signal) changes from the minimum value to the maximum value. At time t11 at which the first time period is ended, the AC voltage VO (S2 signal) changes from the maximum value to the minimum value. Hereinafter, a timing (represented by, e.g., time t10) at which the S2 signal rises is referred to as "voltage phase value".

In the case where the drive frequency fo is higher than the resonance frequency fr1, an inductance reactance component appears in the impedance Z of the feeding coil circuit 120 (LC resonance circuit), and the current phase of the current IS delays with respect to the voltage phase. Thus, the S1 signal indicating the current phase rises at time t18 which is later than time t10. Hereinafter, a timing (represented by, e.g., time t18) at which the S1 signal rises is referred to as "current phase value". In the example of FIG. 27, a value obtained by t10−t18 represents the phase difference. Here, t10−t18<0 is established, so that the current phase delays with respect to the voltage phase.

When the S2 signal rises at time t10, the level of the T7 signal starts increasing. At time t11 at which the level of the S2 signal assumes a low level, the level of the S7 signal also abruptly decreases.

The T6 signal is a DC voltage signal whose level changes depending on the magnitude of the correction voltage. The T7 signal and T6 signal are input to the positive terminal and negative terminal of the comparator 128, respectively, and the T8 signal is output from the comparator 128. When the level of the T7 signal is higher than that of T6 signal (T7>T6), the T8 signal assumes a high level, while when the level of the T7 signal is not higher than that of T6 signal (T7≤T6), the T8 signal assumes a low level. In FIG. 29, the level of the T7 signal is higher than that of the T6 signal (T7>T6) at time t14 (hereinafter, such a timing is referred to also as "voltage phase value after correction") which is later than time t10. The voltage level of the T6 signal serves as a "reference value" for determining the voltage phase value after correction.

The phase comparison circuit 150 compares rising time t18 of the S1 signal and rising time t14 of the T8 signal to calculate a phase difference td. Although the actual phase difference is obtained by t10−t18 (<0), the phase difference recognized by the phase comparison circuit 150 is obtained by t14−t18 (>0). The phase comparison circuit 150 outputs the phase difference indicating voltage SC corresponding to a value obtained by t14−t18. The VCO 202 determines that the current phase advances with respect to the voltage phase based on the phase difference td although actually the current phase delays with respect to the voltage phase. In other words, the VCO 202 determines that the drive frequency fo is lower than the resonance frequency fr1 and tries to eliminate the phase difference by increasing the drive frequency fo. As a result, feedback control is effected such that the power transmission efficiency is degraded, the load voltage V5 is reduced, and the signal level of the T6 signal is reduced so as to eliminate the phase difference.

For example, when the resistance value of the load LD increases, the load current I5 decreases, while the load voltage V5 increases (refer to FIG. 18). When the load voltage V5 increases, the measurement potential increases, while the voltage level of the T0 signal (DC voltage signal) decreases.

When the voltage level of the T0 signal decreases, the signal frequency fs1 thereof increases (refer to FIG. 22). When the signal frequency fs1 increases, the voltage level of the T6 signal (DC voltage signal) increases, with the result that the phase (voltage phase after correction) of the T8 signal delays. The rising time (current phase) of the S1 signal is earlier than the rising time (voltage phase after correction) of the T8 signal, so that the phase comparison circuit 150 recognizes that current phase advances with respect to the voltage phase. In order to delay the current phase, the phase comparison circuit 150 issues the phase difference indicating voltage SC to the VCO 202 so as to make the VCO 202 increase the drive frequency fo. Then, the deviation between the resonance frequency fr1 and drive frequency fo becomes larger to cause the power transmission efficiency to decrease (refer to FIG. 20), with the result that the load voltage V5 decreases. With such feedback control, the load voltage V5 can be kept at a fixed value. The same feedback control is performed when the load voltage V5 decreases.

When the load voltage V5 is 24 (V) which is a target value, the correction voltage becomes 2.5 (V). Thus, even when the load voltage V5 coincides with the target value, the voltage phase value after correction delays with respect to the actual voltage phase value. The magnitude of the phase delay increases/decreases with an increase/decrease in the correction voltage.

Even when the signal level of the T6 signal decreases, the voltage phase value after correction does not advance with respect to the voltage phase value before correction. Therefore, the drive frequency fo is controlled within a range higher than the resonance frequency fr1 and thus stable control can be achieved.

Fourth Embodiment

Figure 30:
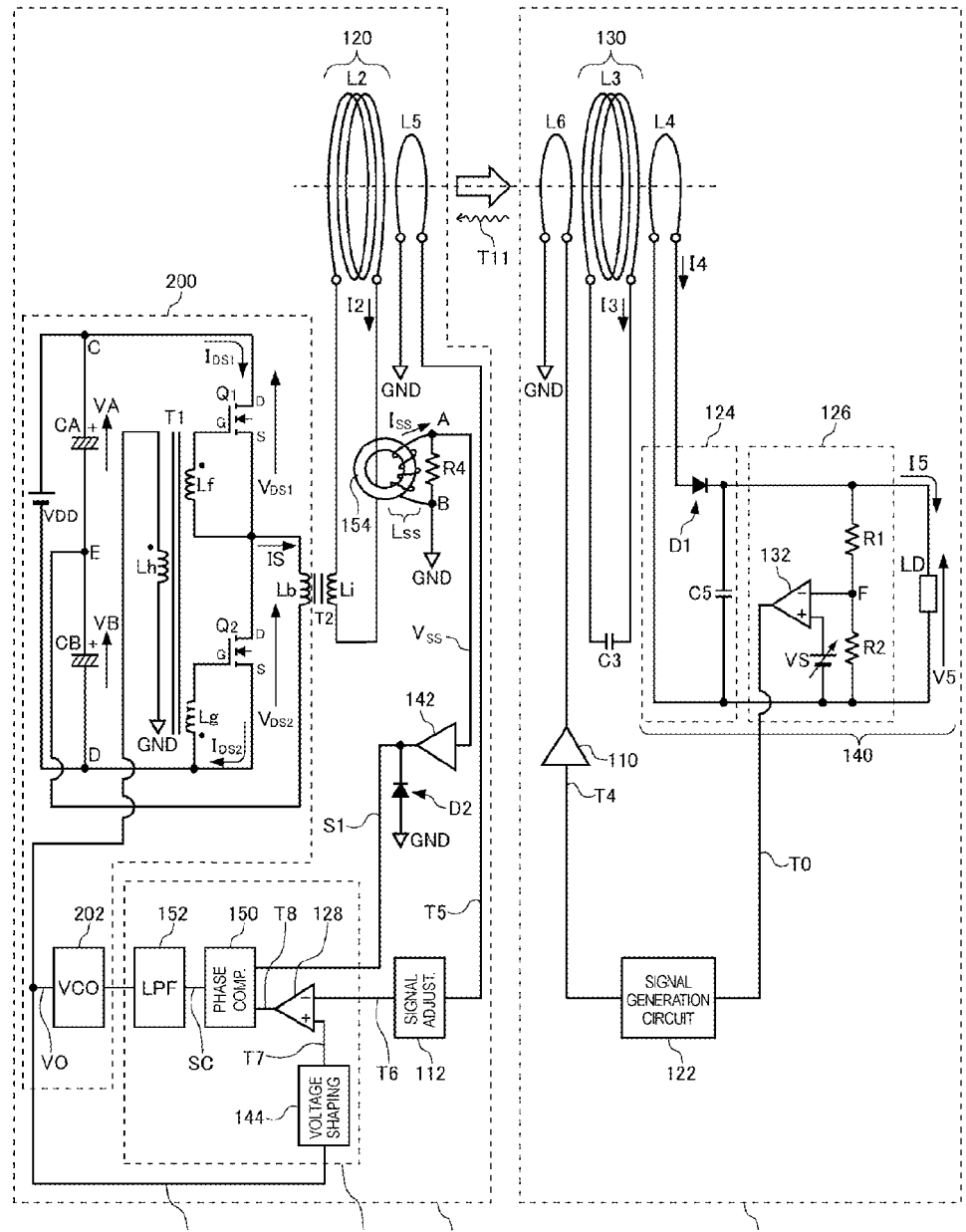
FIG. 30 is a system configuration view of the wireless power transmission system according to a fourth embodiment.

FIG. 30 is a system configuration view of the wireless power transmission system 100 according to a fourth embodiment. The wireless power transmission system 100 of the fourth embodiment operates based on the operational principle described using FIG. 14. That is, the power feeding coil L2 supplies AC power at the resonance frequency fr1 to the power receiving coil L3 in the state the power feeding coil L2 is not resonating. In the wireless power feeder 116 of the fourth embodiment, the capacitor C2 is omitted. Other points are the same as the third embodiment.

The wireless power transmission system 100 has been described above based on the preferred embodiments. In the wireless power feeding of a magnetic field resonance type, the power transmission efficiency can be controlled based on the difference between the resonance frequency fr1 and drive frequency fo. The drive frequency fo can be made to automatically track a change of the resonance frequency fr1, making it easy to kept the power transmission efficiency constant even if use conditions are changed. Further, even when the load LD or inter-coil distance d changes, the load voltage V5 can be kept constant by the feedback control based on the correction voltage. A change of the level of the T8 signal based on the correction voltage allows ex-post adjustment of the power transmission efficiency. According to the experiment made by the present inventor, significant power loss was not found to occur in association with the level adjustment of the T6 signal.

The signal receiving coil L5 receives not only the T11 signal, which is an output signal, but also apart of feeding power (refer to FIGS. 9 and 23). The signal adjustment circuit 112 uses the band-pass filter 158 to extract only a signal component from the AC voltage received by the signal receiving coil L5. The reference frequency fs (=10 MHz) and resonance frequency fr1 (=100 kHz) differ from each other in frequency band, so that the frequencies thereof can easily be isolated from each other. The signal receiving coil L5 or signal transmitting coil L6 may be formed as a simple circular or rectangular single-winding coil.

Further, the reference potential may manually be adjusted on the power receiving side. This allows the correction voltage to be detected not only when the measurement potential changes but also the reference voltage changes, with the result that the power transmission efficiency can be adjusted. For example, when the reference potential is made to decrease, such feedback control as to decrease the measurement potential is made, causing the load voltage V5 to decrease. That is, feeding power can be controlled on the power receiving side.

The above embodiments are merely illustrative of the present invention and it will be appreciated by those skilled in the art that various modifications may be made to the components of the present invention and a combination of processing processes and that the modifications are included in the present invention.

Although the power transmission control circuit 200 is formed as a half-bridge type circuit, the power transmission control circuit 200 may be formed as a full-bridge type circuit in which four MOS-FETs are used or a push-pull type circuit. The T7 signal generated by the voltage shaping circuit 144 or T1 signal generated by the control signal generation circuit 170 may be an AC signal having not only a saw-tooth waveform but also a triangle wave or a sine wave in which a voltage value is gradually increased or decreased within a predetermined time period. Although the voltage phase is set as an adjustment target in the above embodiments, the current phase may be adjusted based on the T0 signal. Further, the feedback control may be effected based not only on the output voltage but on the current or power.

The "AC power" used in the wireless power transmission system 100 may be transmitted not only as an energy but also as a signal. Even in the case where an analog signal or digital signal is fed by wireless, the wireless power transmission method of the present invention may be applied.

What is claimed is:

1. A wireless power feeder that wirelessly feeds power from a power feeding coil to a power receiving coil using a magnetic field resonance phenomenon between the power feeding coil and the power receiving coil, the feeder comprising:
   the power feeding coil;
   a power transmission control circuit that feeds AC power to the power feeding coil at a drive frequency so as to make the power feeding coil feed the AC power to the power receiving coil;
   a phase detection circuit that detects a phase difference between voltage and current phases of the AC power;
   a signal receiving coil that receives, from the AC power receiving side, an output signal having a duty ratio indicating an output level; and
   a signal adjustment circuit that DC-converts the output signal in accordance with the duty ratio,
   the power transmission control circuit adjusting the drive frequency so as to reduce the phase difference,
   the phase detection circuit performing ex-post adjustment of the detected value of one or both of the voltage and current phases in accordance with a signal level of the DC-converted output signal.

2. The wireless power feeder according to claim 1, wherein the phase detection circuit compares a first phase value indicating a timing at which a voltage level of the AC power becomes a first reference value and a second phase value indicating a timing at which a current level of the AC power becomes a second reference value to detect the phase difference and changes one or both of the first and second reference values in accordance with the signal level to perform ex-post adjustment of one or both of the first and second phase values.

3. The wireless power feeder according to claim 1, wherein the signal receiving coil is a single-winding coil.

4. The wireless power feeder according to claim 1, wherein the coil plane of the signal receiving coil and that of the power feeding coil are substantially the same.

5. The wireless power feeder according to claim 1, wherein the signal adjustment circuit extracts an output signal component from the AC voltage detected in the signal receiving coil through a band-pass filter.

6. The wireless power feeder according to claim 1, wherein the power transmission control circuit causes the power feeding coil to which no capacitor is connected in series or in parallel, to feed the AC power to the power receiving coil.

7. The wireless power feeder according to claim 1, wherein the power feeding coil does not form, together with the circuit elements on the power feeding side, a resonance circuit having a resonance point corresponding to a resonance frequency of the power receiving coil.

8. The wireless power feeder according to claim 1, wherein no capacitor is inserted in series or in parallel to the power feeding coil.

9. A wireless power receiver that wirelessly receives, at a power receiving coil, AC power fed from the wireless power feeder as claimed in claim 1, comprising:
- a receiving coil circuit that includes the power receiving coil and a capacitor;
- a loading circuit that includes a loading coil that is magnetically coupled to the power receiving coil to receive the AC power from the power receiving coil and a load to which power is supplied from the loading coil;
- a signal generation circuit that generates an output signal having a duty ratio indicating an output voltage applied to a part of the loading circuit; and
- a signal transmitting coil that transmits the output signal to the wireless power feeder.

10. The wireless power receiver according to claim 9, wherein the signal generation circuit transmits the output signal as a signal indicating a difference value between the output voltage and a reference voltage by the duty ratio.

11. The wireless power receiver according to claim 9, wherein
- the signal generation circuit includes:
  - a control signal generation circuit that generates a control signal at a control frequency; and
  - a comparison circuit that generates an enable signal when a predetermined magnitude relationship is established between the signal level of the control signal and the output voltage, and
- the duty ratio of the output signal is determined based on the duty ratio of the enable signal.

12. The wireless power receiver according to claim 11, wherein
- the signal generation circuit further includes a reference signal generation circuit that generates a reference signal having a reference frequency higher than the control frequency, and
- the signal generation circuit transmits the reference signal as the output signal while the enable signal is being generated.

13. The wireless power receiver according to claim 9, wherein the signal transmitting coil is a single-winding coil.

14. The wireless power receiver according to claim 9, wherein the coil plane of the signal transmitting coil and that of the power receiving coil are substantially the same.

15. A wireless power transmission system for wirelessly feeding power from a power feeding coil to a power receiving coil using a magnetic field resonance phenomenon between the power feeding coil and the power receiving coil, the system comprising:
- a power transmission control circuit that supplies AC power to the power feeding coil at a drive frequency;
- a loading circuit that includes a loading coil that is magnetically coupled to the power receiving coil to receive the AC power from the power receiving coil and a load that receives power from the loading coil;
- a signal generation circuit that generates an output signal having a duty ratio indicating an output voltage applied to a part of the loading circuit;
- a signal transmitting coil that transmits the generated output signal to the power feeding side;
- a signal receiving coil that receives the transmitted output signal;
- a signal adjustment circuit that DC-converts the received output signal in accordance with the duty ratio; and
- a phase detection circuit that detects a phase difference between voltage and current phases of the AC power,
- the power transmission control circuit adjusting the drive frequency so as to reduce the phase difference, and
- the phase detection circuit performing ex-post adjustment of the detected value of one or both of the voltage and current phases in accordance with a signal level of the DC-converted output signal.

16. A wireless power feeder that wirelessly feeds power from a power feeding coil to a power receiving coil using a magnetic field resonance phenomenon between the power feeding coil and the power receiving coil, the feeder comprising:
- the power feeding coil;
- a power transmission control circuit that feeds AC power to the power feeding coil at a drive frequency so as to make the power feeding coil feed the AC power to the power receiving coil;
- a phase detection circuit that detects a phase difference between voltage and current phases of the AC power;
- a signal receiving coil that receives, from the AC power receiving side, an output signal indicating an output level by the magnitude of a signal frequency; and
- a signal adjustment circuit that DC-converts the output signal in accordance with the signal frequency,
- the power transmission control circuit adjusting the drive frequency so as to reduce the phase difference, and
- the phase detection circuit performing ex-post adjustment of the detected value of one or both of the voltage and current phases in accordance with a signal level of the DC-converted output signal.

17. The wireless power feeder according to claim 16, wherein the phase detection circuit compares a first phase value indicating a timing at which the voltage level of the AC power becomes a first reference value and a second phase value indicating a timing at which the current level of the AC power becomes a second reference value to detect the phase difference and changes one or both of the first and second reference values based on the output signal to perform ex-post adjustment of one or both of the first and second phase values.

18. The wireless power feeder according to claim 16, wherein the signal receiving coil is a single-winding coil.

19. The wireless power feeder according to claim 16, wherein the coil plane of the signal receiving coil and that of the power feeding coil are substantially the same.

20. The wireless power feeder according to claim 16, wherein the signal adjustment circuit extracts an output signal component from the AC voltage detected in the signal receiving coil through a band-pass filter.

21. The wireless power feeder according to claim 16, wherein the power transmission control circuit causes the power feeding coil to which no capacitor is connected in series or in parallel, to feed the AC power to the receiving coil.

22. The wireless power feeder according to claim 16, wherein the power feeding coil does not form, together with circuit elements on the power feeding side, a resonance circuit having a resonance point corresponding to the resonance frequency of the power receiving coil.

23. The wireless power feeder according to claim 16, wherein no capacitor is inserted in series or in parallel to the power feeding coil.

24. A wireless power receiver that receives, at a power receiving coil, AC power fed from the wireless power feeder as claimed in claim 16 by wireless, said receiver comprising:
- a receiving coil circuit that includes the power receiving coil and a capacitor;
- a loading circuit that includes a loading coil that is magnetically coupled to the power receiving coil to receive the AC power from the power receiving coil and a load to which power is supplied from the loading coil;

a signal generation circuit that generates an output signal indicating an output voltage applied to a part of the loading circuit by a signal frequency; and a signal transmitting coil that transmits the output signal to the wireless power feeder.

25. The wireless power receiver according to claim 24, wherein the signal generation circuit generates the output signal as a signal indicating a difference value between the output voltage and a reference voltage by the signal frequency.

26. The wireless power receiver according to claim 24, wherein the signal transmitting coil is a single-winding coil.

27. The wireless power receiver according to claim 24, wherein the coil plane of the signal transmitting coil and that of the power receiving coil are substantially the same.

28. A wireless power transmission system for wirelessly feeding power from a power feeding coil to a power receiving coil using a magnetic field resonance phenomenon between the power feeding coil and the power receiving coil, the system comprising:

a power transmission control circuit that supplies AC power to the power feeding coil at a drive frequency;

a loading circuit that includes a loading coil that is magnetically coupled to the power receiving coil to receive the AC power from the power receiving coil and a load circuit that receives power from the loading coil;

a signal generation circuit that generates an output signal indicating an output voltage applied to a part of the loading circuit by a signal frequency;

a signal transmitting coil that transmits the generated output signal to the power feeding side;

a signal receiving coil that receives the transmitted output signal;

a signal adjustment circuit that DC-converts the received output signal in accordance with the signal frequency; and a phase detection circuit that detects a phase difference between voltage and current phases of the AC power, the power transmission control circuit adjusting the drive frequency so as to reduce the phase difference, and the phase detection circuit performing ex-post adjustment of the detected value of one or both of the voltage and current phases in accordance with a signal level of the DC-converted output signal.

* * * * *